(12) United States Patent
Higuchi et al.

(10) Patent No.: US 8,477,732 B2
(45) Date of Patent: Jul. 2, 2013

(54) APPARATUS AND METHOD FOR DETERMINING UPLINK TRANSMISSION PARAMETERS

(75) Inventors: Kenichi Higuchi, Yokohama (JP);
Hiroyuki Atarashi, Yokohama (JP);
Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 614 days.

(21) Appl. No.: 12/092,072

(22) PCT Filed: Oct. 31, 2006

(86) PCT No.: PCT/JP2006/322210
§ 371 (c)(1),
(2), (4) Date: Aug. 4, 2008

(87) PCT Pub. No.: WO2007/052812
PCT Pub. Date: May 10, 2007

(65) Prior Publication Data
US 2009/0247180 A1    Oct. 1, 2009

(30) Foreign Application Priority Data

Oct. 31, 2005  (JP) ................................ 2005-317569
Jan. 17, 2006  (JP) ................................ 2006-009300

(51) Int. Cl.
*H04W 4/00* (2009.01)
(52) U.S. Cl.
USPC .... 370/332; 370/334; 370/395.21; 455/452.2
(58) Field of Classification Search
None
See application file for complete search history.

(56) References Cited

U.S. PATENT DOCUMENTS

| | | | |
|---|---|---|---|
| 7,787,412 B2 * | 8/2010 | Vadgama et al. | 370/320 |
| 2002/0155853 A1 | 10/2002 | Lee et al. | |
| 2002/0187799 A1 * | 12/2002 | Haartsen | 455/509 |
| 2003/0202574 A1 | 10/2003 | Budka et al. | |
| 2004/0081248 A1 | 4/2004 | Parolari | |
| 2004/0120411 A1 | 6/2004 | Walton et al. | |
| 2004/0203992 A1 | 10/2004 | Yun | |
| 2005/0213674 A1 | 9/2005 | Kobayashi | |
| 2010/0210235 A1 * | 8/2010 | Ulupinar et al. | 455/278.1 |

FOREIGN PATENT DOCUMENTS

| | | |
|---|---|---|
| EP | 1251663 A2 | 10/2002 |
| EP | 1255368 A1 | 11/2002 |
| JP | 03-060251 U | 8/1999 |
| JP | 11-215094 | 8/1999 |

(Continued)

OTHER PUBLICATIONS

Taiwanese Office Action for Application No. 95140016, mailed on Jan. 27, 2010 (7 pages).

(Continued)

*Primary Examiner* — Andrew Lai
*Assistant Examiner* — Leon Andrews
(74) *Attorney, Agent, or Firm* — Osha • Liang LLP

(57) ABSTRACT

An apparatus determines a transmission bandwidth for uplink transmission of a signal and includes a reception unit that receives a predefined signal from a mobile station and derives a channel quality indicator based on the received signal. The apparatus also includes a storage unit that stores a relationship between the channel quality indicator and the transmission bandwidth of the mobile station. The apparatus also includes a determination unit that determines the transmission bandwidth based on the relationship and a transmission unit that transmits the transmission bandwidth to the mobile station.

10 Claims, 25 Drawing Sheets

FOREIGN PATENT DOCUMENTS

| | | |
|---|---|---|
| JP | 2003-324385 | 11/2003 |
| JP | 2005-86593 | 3/2005 |
| JP | 2005-142923 | 6/2005 |
| JP | 2005-286446 | 10/2005 |
| RU | 2267863 C2 | 2/2005 |
| RU | 2003125611 A | 2/2005 |
| WO | 2004038986 A2 | 5/2004 |
| WO | 2004/077778 | 9/2004 |

OTHER PUBLICATIONS

Russian Office Action for Application No. 2008119078/09, mailed on Jun. 2, 2010 (8 pages).

esp@cenet Patent Abstract for Russian Publication No. 2003125611, publication date Feb. 27, 2005. (1 page).

International Search Report (English & Japanese) for PCT/JP2006/322210 mailed Dec. 5, 2006 (9 pages).

Written Opinion of ISA (Japanese only) for PCT/JP2006/322210 (4 pages), Dec. 5, 2006.

3GPP TR 25.848 V4.0.0 Mar. 2001 "Physical Layer Aspects of UTRA High Speed Downlink Packet Access" (89 pages).

Office Action for Japanese Patent Application No. 2006-009300 mailed Apr. 5, 2011, with partial English translation thereof (5 pages).

Patent Abstract for Japanese Publication No. 03-060251 Published Mar. 15, 1991 (1 page).

Extended European search Report dated May 4, 2012 in corresponding European Patent Appoication No. 06823114.1 (9 pages).

\* cited by examiner

FIG.4

| RECEPTION POWER OF UPLINK PILOT AT BASE STATION | CHANNEL QUALITY INDICATOR | TRANSMISSION POWER OF DATA CHANNEL | RECEPTION POWER PER UNIT BAND FOR EACH BANDWIDTH | | | | |
|---|---|---|---|---|---|---|---|
| | | | 1.25 MHz | 2.5 MHz | 5 MHz | 10 MHz | 20 MHz |
| $R_1$ <br> LOW ↔ HIGH <br> $R_x$ | $CQI_1$ <br> NO GOOD ↔ GOOD <br> $CQI_x$ | $PT_1$ <br> HIGH ↔ LOW <br> $PT_x$ | $D_{1,1.25}$ <br> ↔ <br> $D_{X,1.25}$ | $D_{1,2.5}$ <br> ↔ <br> $D_{X,2.5}$ | $D_{1,5}$ <br> ↔ <br> $D_{X,5}$ | $D_{1,10}$ <br> ↔ <br> $D_{X,10}$ | $D_{1,20}$ <br> ↔ <br> $D_{X,20}$ |

| INSTANTANEOUS CHANNEL QUALITY IN CONSIDERATION OF TRANSMISSION BANDWIDTH | COMBINATION OF DATA MODULATION SCHEME AND CHANNEL CODING RATE |
|---|---|
| $CQI'_1$<br>NOT GOOD ↑<br><br>GOOD ↓<br>$CQI'_x$ | $MCS_1$<br>LOW ↑<br><br>HIGH ↓<br>$MCS_x$ |

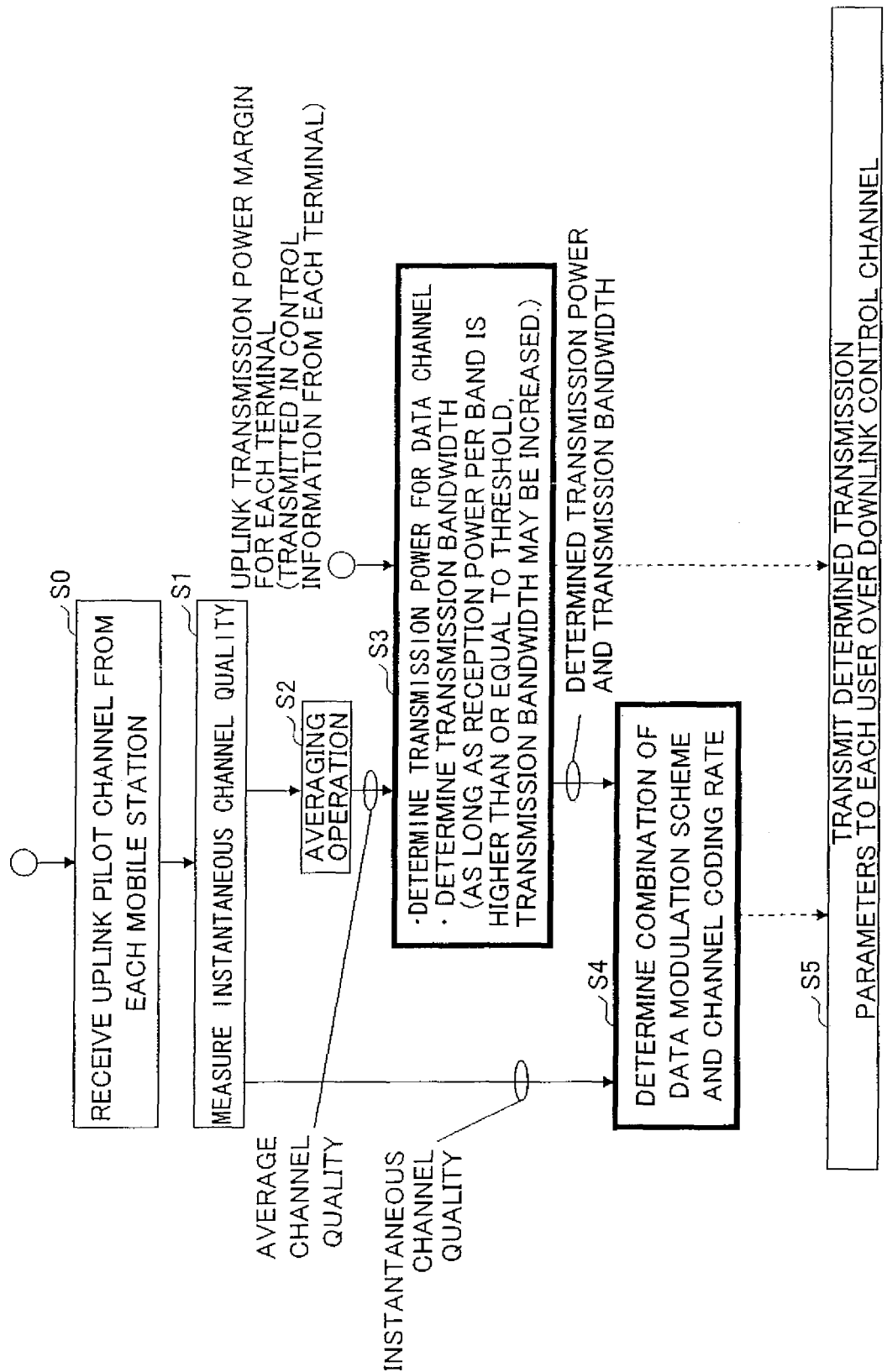

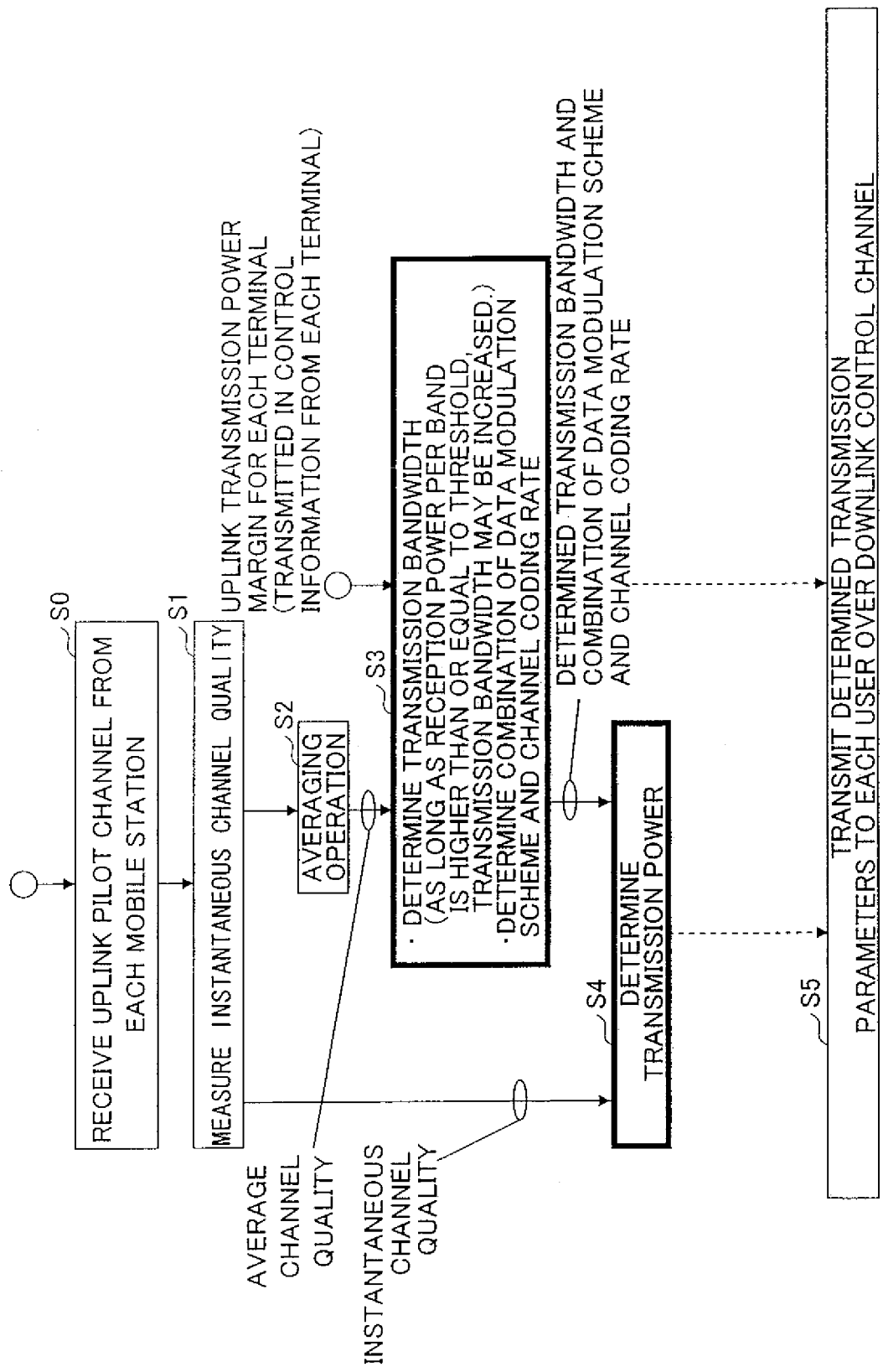

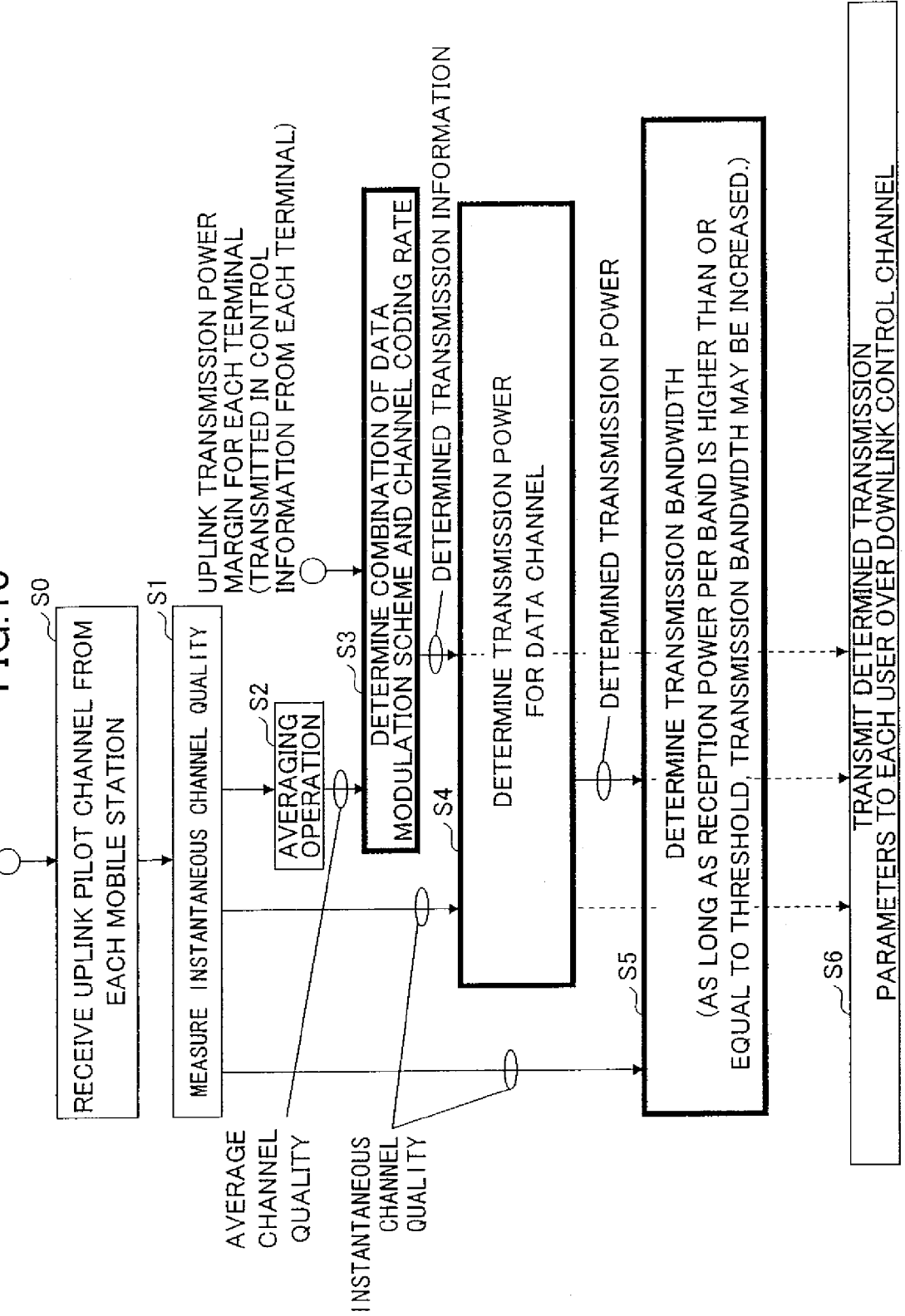

RELATIONSHIP AMONG RECEPTION POWER, BANDWIDTH AND THRESHOLD ASSOCIATED WITH UPLINK OF USER A

RELATIONSHIP AMONG RECEPTION POWER, BANDWIDTH AND THRESHOLD ASSOCIATED WITH UPLINK OF USER B

|  | CONTROL OVER TRANSMISSION POWER | CONTROL OVER TRANSMISSION BANDWIDTH | AMC CONTROL |
|---|---|---|---|
| 1$^{ST}$ EMBODIMENT (FIG. 3) | LOW | HIGH | HIGH |
| 2$^{ND}$ EMBODIMENT (FIG. 8) | LOW | LOW | HIGH |
| 3$^{RD}$ EMBODIMENT (FIG. 9) | HIGH | LOW | LOW |
| 4$^{TH}$ EMBODIMENT (FIG. 10) | HIGH | HIGH | LOW |

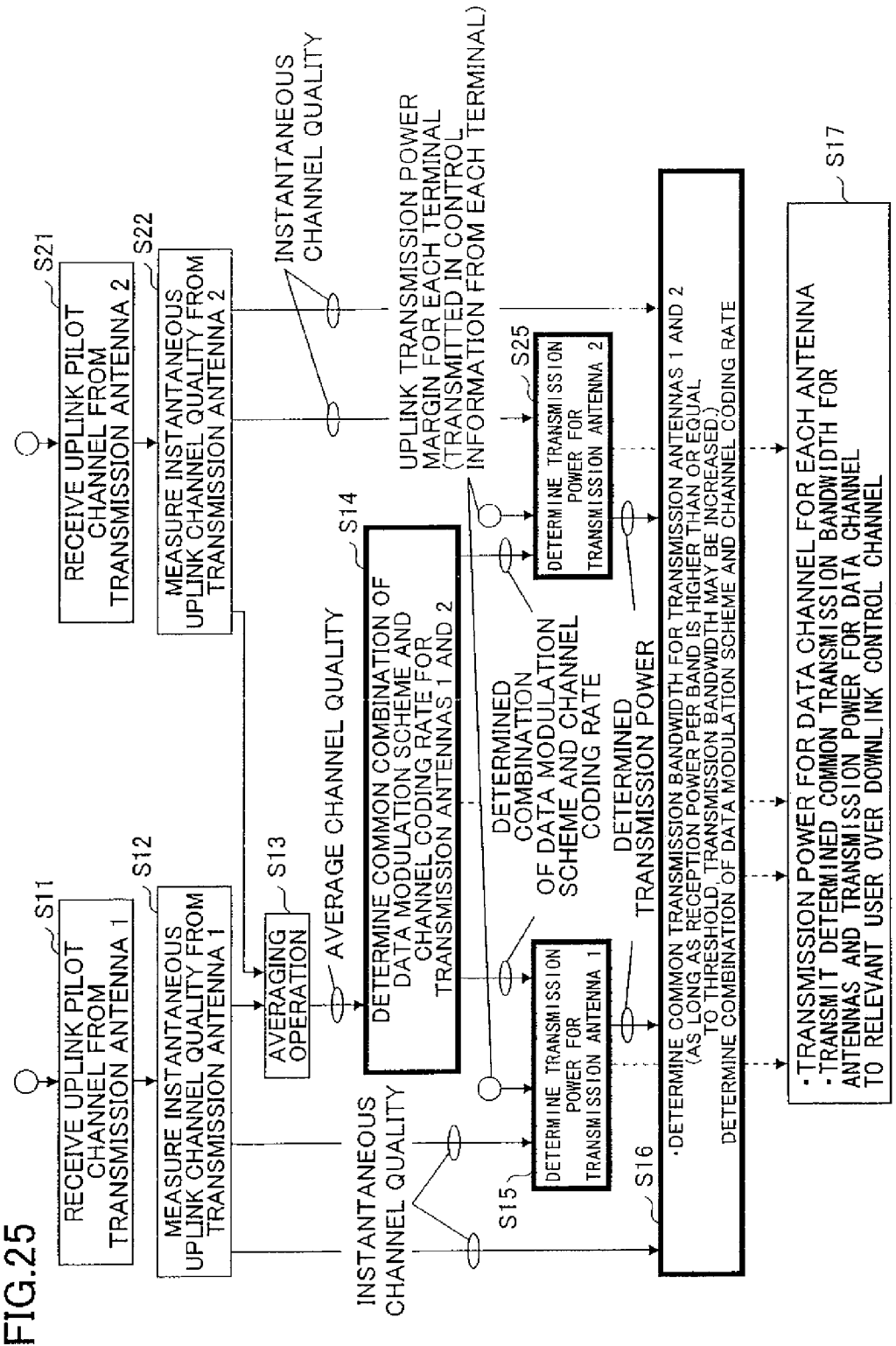

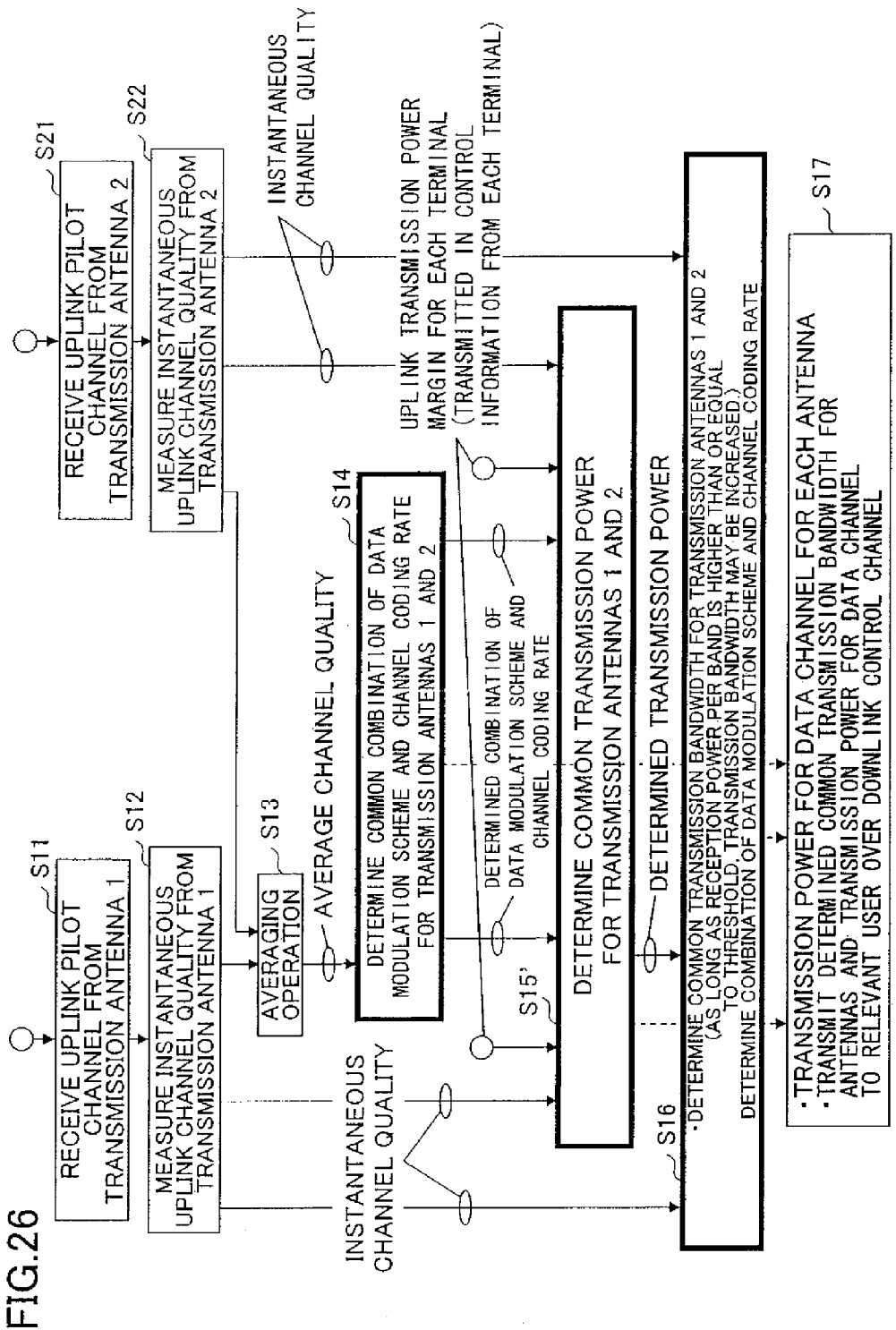

FIG.27

| | CONTROL OVER TRANSMISSION POWER | CONTROL OVER TRANSMISSION BANDWIDTH | AMC CONTROL |
|---|---|---|---|
| 7TH EMBODIMENT (FIG. 19) (FIG. 20) | LOW (COMMON) | HIGH (COMMON) | HIGH (SEPARATE) HIGH (COMMON) |
| 8TH EMBODIMENT (FIG. 21) (FIG. 22) | LOW (COMMON) | LOW (COMMON) | HIGH (SEPARATE) HIGH (COMMON) |
| 9TH EMBODIMENT (FIG. 23) (FIG. 24) | HIGH (SEPARATE) HIGH (COMMON) | LOW (COMMON) | LOW (COMMON) |
| 10TH EMBODIMENT (FIG. 25) (FIG. 26) | HIGH (SEPARATE) HIGH (COMMON) | HIGH (COMMON) | LOW (COMMON) |

APPARATUS AND METHOD FOR DETERMINING UPLINK TRANSMISSION PARAMETERS

TECHNICAL FIELD

The present invention generally relates to the technical field of radio communications, and more particularly relates to an apparatus and a method for determining transmission parameters for transmitting shared packet data channels in uplink channels.

BACKGROUND ART

In this technical field, a variety of techniques for improving the quality of radio transmitted uplink signals are used. One of the techniques relates to a transmission power control method. In this technique, the reception quality of an uplink pilot channel transmitted from a mobile station and received at a base station is measured. Then, path loss and/or other factors may be evaluated, and the transmission power for the mobile station is determined to compensate for the factors. The determined transmission power is reported to the mobile station. In this manner, a certain quality level of the received signals can be assured at the base station. Another technique for improving the signal quality relates to Adaptive Modulation and channel Coding (AMC) method. The AMC method may achieve the best possible throughput under the current communication conditions by adaptively changing modulation level and coding rate depending on the quality of radio channels. The AMC method is used in High Speed Downlink Packet Access (HSDPA) scheme, for example. The HSDPA is described in detail in non-patent document 1, for example.

In this manner, the throughput can be improved by setting transmission parameters such as the transmission power and the modulation level appropriately. The throughput may include respective user throughputs as well as the overall system throughput, and it is desirable to improve both the user throughputs and the system throughput. In particular, there may be demand of further improved throughput in future communication systems. For this reason, it is much more important to adapt the transmission parameters for the channel quality, which is referred to as "link adaptation", for improved signal transmission quality.

Non-patent document 1: 3GPP TR25.848: "Physical Layer Aspects of UTRAN High Speed Downlink Packet Access"

DISCLOSURE OF INVENTION

Problem to be Solved by the Invention

The object of the present invention is to provide an apparatus and a method for determining transmission parameters suitable for uplink radio channel quality.

Means for Solving the Problem

In one aspect of the present invention, an apparatus for determining uplink transmission parameters includes a reception unit receiving a channel quality indicator from a mobile station, a storage unit storing relationships among a channel quality indicator, a modulation scheme and a channel coding rate for an uplink, and one or both of transmission power level and transmission bandwidth for a mobile station, a determination unit determining a set of transmission parameters based on the relationships, and a transmission unit transmitting the set of transmission parameters to the mobile station.

Advantage of the Invention

According to the embodiment of the present invention, an apparatus and a method for determining transmission parameters suitable for uplink radio channel quality can be provided.

BRIEF DESCRIPTION OF DRAWINGS

FIG. 4 shows an exemplary lookup table;

FIG. 8 is a flowchart (2) of another transmission parameter determination method according to one embodiment of the present invention;

FIG. 9 is a flowchart (3) of another transmission parameter determination method according to one embodiment of the present invention;

FIG. 10 is a flowchart (4) of another transmission parameter determination method according to one embodiment of the present invention;

FIG. 25 is a flowchart (4) of a transmission parameter determination method according to one embodiment of the present invention;

FIG. 26 shows a variation of the flowchart illustrated in FIG. 25; and

FIG. 27 shows an exemplary comparison table of seventh through tenth embodiments.

LIST OF REFERENCE SYMBOLS

Figure 1:
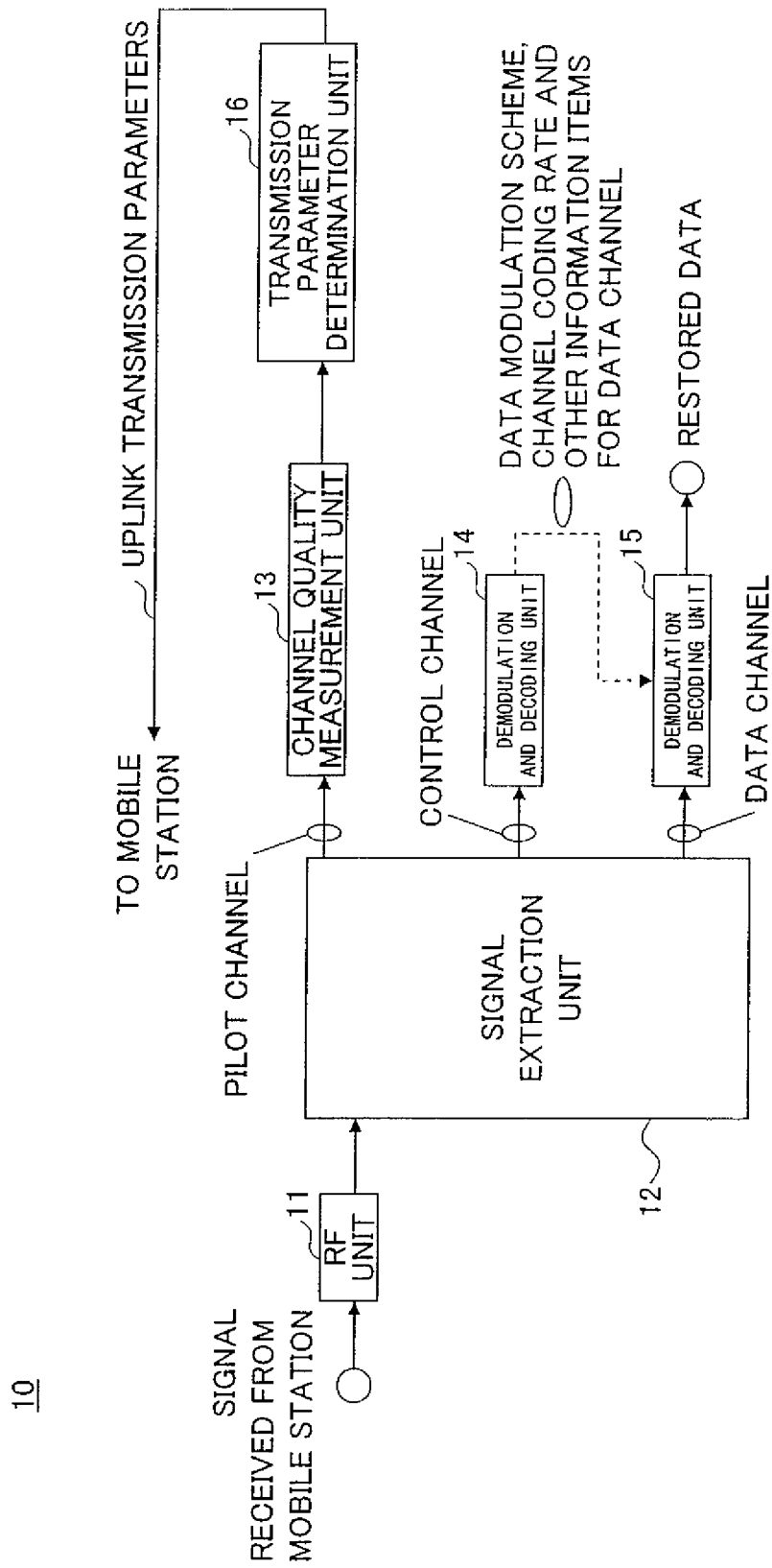
FIG. 1 is a schematic block diagram of a base station according to one embodiment of the present invention.

10: base station
11: radio frequency unit
12: signal extraction unit
13: channel quality measurement unit
14, 15: demodulation decoding unit
16: transmission parameter determination unit
20: mobile station
21: transmission buffer
22, 23: modulation encoding unit
24 multiplexing unit
25: bandlimiting filter
26: radio frequency unit
27: power amplification unit
28: downlink control channel demodulation decoding unit
171: signal separation unit

BEST MODE FOR CARRYING OUT THE INVENTION

In one embodiment of the present invention, a set of transmission parameters is derived based on a channel quality indicator received from a mobile station. The set of transmission parameters is derived from a stored correspondence of channel quality indicator, modulation scheme and the channel coding rate in uplink, and both or either of the transmission power and the transmission bandwidth of a mobile station and is reported to the mobile station. The mobile station determines various settings suitable for the transmission parameters for subsequent transmission of uplink signals.

Since not only the AMC and the transmission power but also the transmission bandwidth may be adapted depending on the communication conditions, more combinations of the transmission parameters can be obtained and the transmission parameters can be more suitably combined depending on the channel quality. As a result, the quality of the signal transmission can be further improved.

In one embodiment, the set of transmission parameters may be derived to adaptively adjust the uplink data rate for a certain duration while the transmission power is kept constant. For example, the transmission power may be derived from the time average value of the channel quality indicator while the transmission bandwidth, the modulation level and the channel coding rate may be derived from instantaneous values of the channel quality indicator. Alternatively, the transmission power and the transmission bandwidth may be derived from the average value of the channel quality indicator. As a result, the overall system throughput can be improved and thus the resources can be more efficiently used.

In another embodiment, the set of transmission parameters may be derived to adjust the transmission power while the uplink data rate is kept constant for a certain duration. For example, the transmission bandwidth, the modulation level and the channel coding rate may be derived from the time average value of the channel quality indicator while the transmission power may be derived from instantaneous values of the channel quality indicator. This embodiment is particularly advantageous to communications where real time communications are strongly demanded.

Alternatively, the set of transmission parameters may be derived to improve at least one of the uplink reception error rate and the throughput.

Respective channel quality indicator items may be received from multiple mobile stations, and the set of transmission parameters may be derived from the channel quality indicator items. In this case, a more appropriate transmission bandwidth can be determined by taking into account the individual mobile stations as well as interoperation between the mobile stations.

First Embodiment

FIG. 1 is a schematic block diagram of a base station according to one embodiment of the present invention. The base station 10 includes a radio frequency (RF) unit 11, a signal extraction unit 12, a channel quality measurement unit 13, demodulation and decoding units 14, 15 and a transmission parameter determination unit 16.

The radio frequency (RF) unit 11 performs various operations, such as frequency conversion, band limitation or analog-to-digital conversion, to convert radio packets transmitted from a mobile station and received at an antenna (not shown) into baseband signals. The radio packets may not be transmitted from mobile stations and may be transmitted from any other types of communication terminals including a fixed station. For simplicity of explanation, the present invention is described below in conjunction with the mobile stations.

The signal extraction unit 12 is coupled to an output of the RF unit 11 for extracting and supplying a pilot channel, a shared packet control channel (referred to as "control channel" hereinafter) and a shared packet data channel (referred to as "data channel" hereinafter) in a received signal. The pilot channel, the control channel and the data channel are time-multiplexed, frequency-multiplexed or code-multiplexed or a combination thereof for radio transmission. Thus, the signal extraction unit 12 extracts the multiplexed signal and serves as a demultiplexer.

The channel quality measurement unit 13 is coupled to an output of the signal extraction unit 12 for measuring the reception quality of the pilot channel and supplying instantaneous values of the reception quality. Typically, the reception quality or the channel quality is measured in the signal power to noise power ratio (SIR or reception SIR) of a received pilot channel. In general, however, they may be evaluated using any suitable channel quality indicator or Channel Quality Indicator (CQI). Also, the channel quality measurement unit 13 averages instantaneous values of the reception quality over a certain duration, for example, over a certain duration ranging from 10 ms to 1 second for computing the time average of the reception quality and supplying average channel quality.

The demodulation and decoding units 14, 15 receive the control channel and the data channel, respectively, from the signal extraction unit 12. The demodulation and decoding unit 14 demodulates and decodes the received control channel, extracts information required to demodulate the data channel (e.g., the modulation level and the channel coding rate), and provides it to the demodulation and decoding unit 15. Based on the provided control information, the demodulation and decoding unit 15 demodulates and decodes the received data channel for further data transmission and other operations.

The transmission parameter determination unit 16 is coupled to the channel quality measurement unit 13 for deriving and supplying a set of transmission parameters for subsequent uplinks based on instantaneous values of the reception quality and the time average value. The set of transmission parameters may include some parameters related to uplink signal transmission such as the transmission power level of a mobile station, the transmission bandwidth, the modulation level and the channel coding rate. Such a set of transmission parameters may be derived at an appropriate frequency for each mobile station. The derived set of transmission parameters is provided to mobile stations via downlink control channels. It is described in detail below how to derive the transmission parameters.

Figure 2:
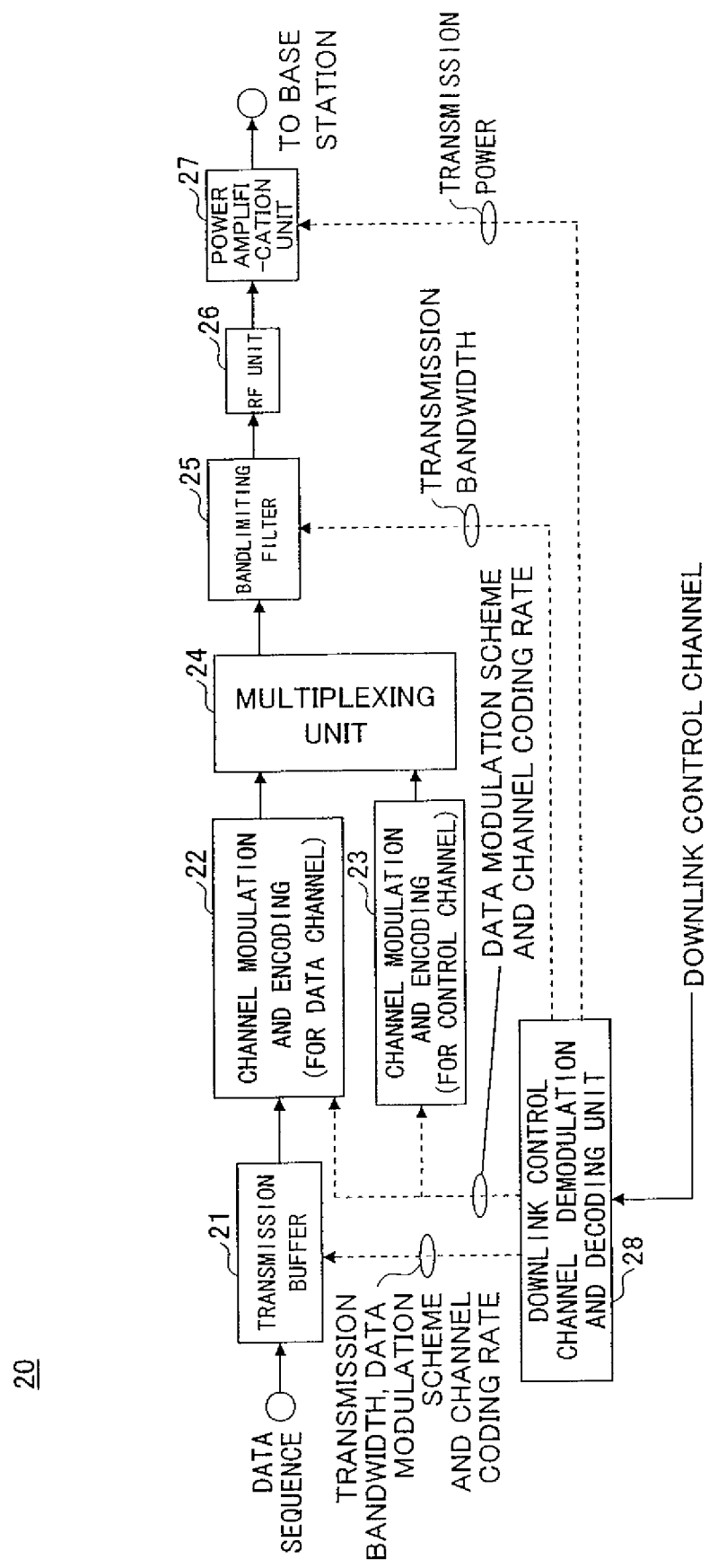
FIG. 2 is a schematic block diagram of a mobile station according to one embodiment of the present invention.

FIG. 2 is a schematic block diagram of a mobile station according to one embodiment of the present invention. A mobile station 20 includes a transmission buffer 21, modulation and encoding units 22, 23, a multiplexing unit 24, a bandlimiting filter 25, a radio frequency (RF) unit 26, a power amplification unit 27 and a demodulation and decoding unit 28 for control channels. Note that no demodulation and decoding unit for data channels is illustrated for simplicity.

The transmission buffer 21 temporarily stores traffic data that a user is to transmit and supplies the traffic data in accordance with a specified data rate. Although there are in practice some elements to store and supply data for control channels, they are omitted for simplicity. The traffic data forms data channels in transmitted signals.

The modulation and encoding unit 22 is coupled to an output of the transmission buffer 21 for channel encoding and data modulating data channels to fulfill the specified data rate.

The modulation and encoding unit 23 channel encodes and data modulates control channels.

The multiplexing unit is coupled to the modulation and encoding units 22, 23 for multiplexing the data channels and the control channels. The multiplexing may be time-multiplexing, frequency-multiplexing, code-multiplexing or a combination thereof.

The bandlimiting filter 25 sets the bandwidth of transmitted signals in accordance with instructions. In this embodiment, five bandwidths, 1.25 MHz, 2.5 MHz, 5 MHz, 10 MHz and 20 MHz are covered by the system, and one of the five bandwidths is arbitrarily selected. Of course, the present invention is not limited to the above-mentioned specific values and types of bandwidths, and any other values and types of bandwidths may be used.

The radio frequency (RF) unit 26 performs various operations, such as digital-to-analog conversion or frequency conversion, for converting baseband signals into radio signals.

The power amplification unit 27 amplifies the power of transmitted signals in accordance with instructions.

The control channel demodulation and decoding unit 28 demodulates and decodes control channels received in downlinks and extracts a set of transmission parameters including the transmission power, the transmission bandwidth, the modulation level and the channel coding rate. The demodulation and decoding unit 28 provides the extracted transmission parameters to the transmission buffer 21, the modulation and encoding units 22, 23, the bandlimiting filter 25 and the power amplification unit 27.

Figure 3:
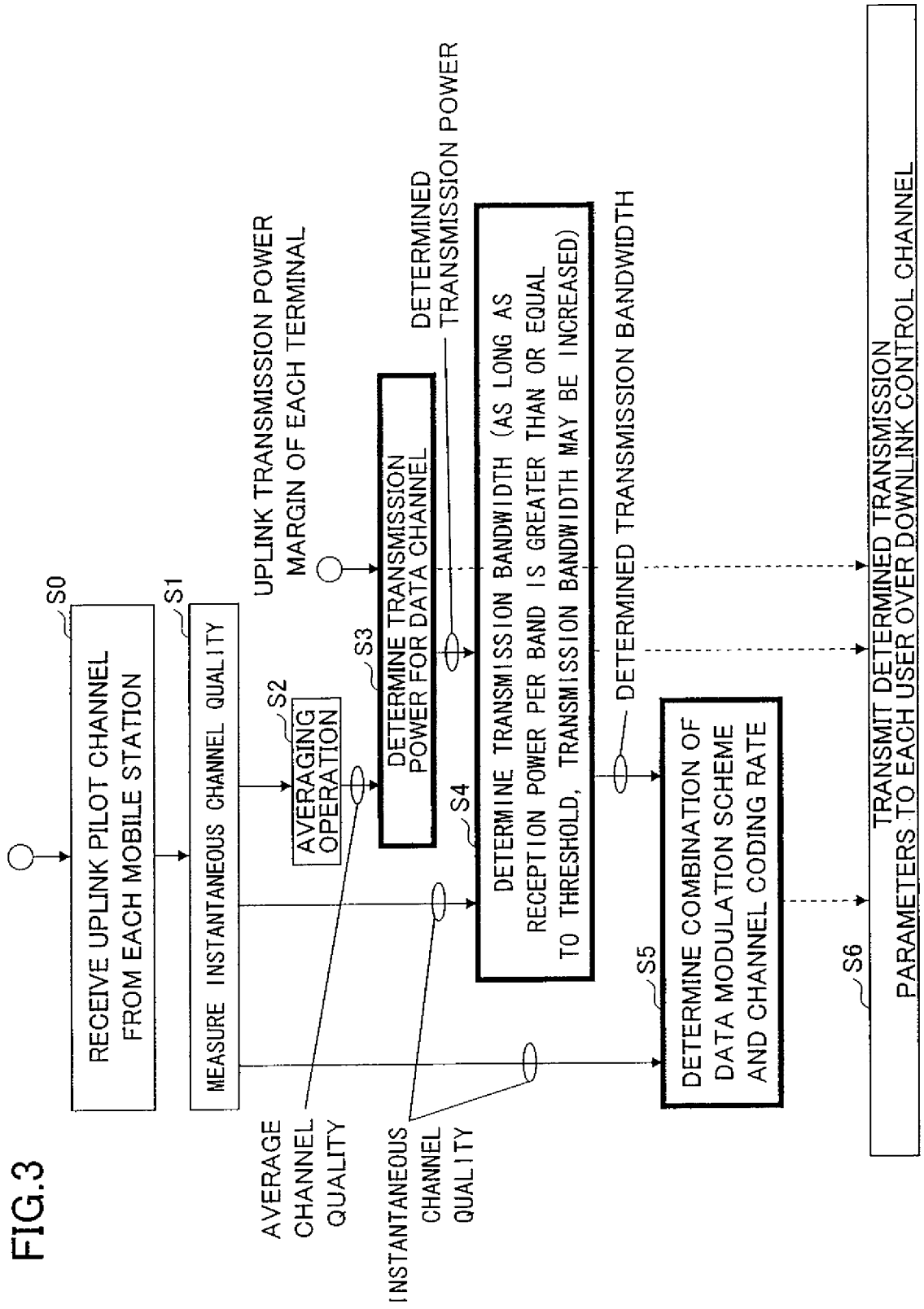
FIG. 3 is a flowchart (1) of a transmission parameter determination method according to one embodiment of the present invention.

FIG. 3 is a flowchart of a transmission parameter determination method according to one embodiment of the present invention. This flow is carried out in a base station, and specifically the channel quality measurement unit 13 and the transmission parameter determination unit 16 are mainly responsible for the flow. The flow starts with step S0 where pilot channels are received in uplinks from individual mobile stations. At step S1, the reception quality or an instantaneous value of the channel quality is measured based on the reception power level of the pilot channels. As stated above, the reception quality or the channel quality may be evaluated in reception SIR. The reception SIR is used as the channel quality indicator or CQI. The base station may perform frequency scheduling based on the reception SIR and assign appropriate frequency bands for the mobile stations.

At step S2, instantaneous values of the channel quality indicator are measured for a certain duration, which may typically range from 10 ms to 1 second but may have various values depending on applications, and the time average value of the channel quality indicator is computed.

At step S3, the transmission power of the mobile stations in transmission of data channels is determined based on the time average value of the channel quality. In this case, transmission power margin of the mobile stations together with the time average value of the channel quality indicator may be taken into account. This is why the possible transmission power level of the mobile stations may be variable depending on performance of the mobile stations. In this embodiment, the transmission power of the mobile stations is determined with reference to a lookup table.

FIG. 4 shows an exemplary lookup table. In the illustrated embodiment, exemplary relationships are illustrated among reception power levels $R_1$ to $R_x$ of a pilot channel in a base station, the quality levels $CQI_1$ to $CQI_X$ of the channel quality indicator, transmission power levels $PT_1$ to $PT_X$ of a mobile station and reception power levels $D_{1,W}$ to $D_{X,W}$ per bandwidth in the base station. The reception power is provided for each of different bandwidths W. These relationships are stored in an appropriate storage and may be read and updated as needed. At step S3 of this embodiment, the transmission power level is determined by identifying $CQI_i$ corresponding to the time average value of the channel quality indicator and finding the transmission power level $PT_i$ corresponding to the identified $CQI_i$. Note that the relationship between the channel quality indicator and the transmission power in the lookup table may be determined in consideration of interference to peripheral cells and/or fairness of the data rates achievable by different mobile stations. If the transmission power of a mobile station in the neighborhood in the cell boundary is increased only in consideration of the reception condition, its adjacent cells on the periphery of the cell boundary may suffer more significant interference. Thus, it is desirable that the lookup table be determined in consideration of the interference to the cells on the periphery of the cell boundary. On the other hand, mobile stations in the neighborhood of a base station may provide little interference to cells on the periphery of the cell boundary. Thus, the achievable data rate can be increased without significant interference to the cells on the periphery of the cell boundary by increasing the transmission power. In this case, the data rate of mobile stations in the neighborhood of the base station is enhanced at the cost of sacrificing the achievable data rate of mobile stations on the periphery of the cell boundary, and thus it is desirable that fairness among the respective achievable data rates of the multiple mobile stations be taken into account.

At step S4 in FIG. 3, the transmission bandwidth for uplink data channels is determined based on the instantaneous value $CQI_i$ of the channel quality and the determined transmission power $PT_i$. In this embodiment, the five uplink bandwidths 1.25 MHz, 2.5 MHz, 5 MHz, 10 MHz and 20 MHz are provided. In this step, the most suitable one for the current channel quality is selected among the uplink bandwidths. The transmission power per unit band (at a base station) illustrated in FIG. 4 indicates an estimated power level received at the base station in the case where a mobile station transmits signals in a certain bandwidth W at the transmission power level $PT_i$. For example, if the bandwidth is 1.25 MHz and the transmission power level is $PT_1$, the reception power level per unit band at the base station may be $D_{1,1.25}$. If the transmission power level is $PT_1$ and the bandwidth is 2.5 MHz, the reception power level at the base station may be $D_{1,2.5}$. In this manner, if the transmission power levels $PT_1$ to $PT_x$ are provided for the five different bandwidths, the reception power levels $D_{1,1.25}, \ldots, D_{x,20}$ per bandwidth at the base station may be provided in the table. Also, the transmission bandwidth supported by mobile stations may be taken into account to determine the transmission bandwidth. This is why the achievable transmission bandwidth by mobile stations may differ depending on the performance of the mobile stations. In the assignment of the transmission bandwidth, in addition to the data rate required by a target mobile station, the assignment of the transmission bandwidth to other mobile stations may be taken into account. In this case, the transmission bandwidth is assigned as part of frequency scheduling involved in the assignment of the transmission bandwidth to multiple mobile stations. Since the transmission power level $PT_i$ is derived from the time average value of the channel quality indicator at step 3, the reception power level $D_{i,W}$ derived from the transmission power level $PT_i$ may also indicate an average value. In this embodiment, the average reception power is corrected based on the instantaneous value $CQI_t$ of the channel quality indicator, and then instantaneous reception power $D_{i,w}'$ is derived. Based on the estimated instantaneous reception power as derived in this manner and a predetermined threshold, the optimal instantaneous transmission bandwidth is derived.

Figures 5, 6:
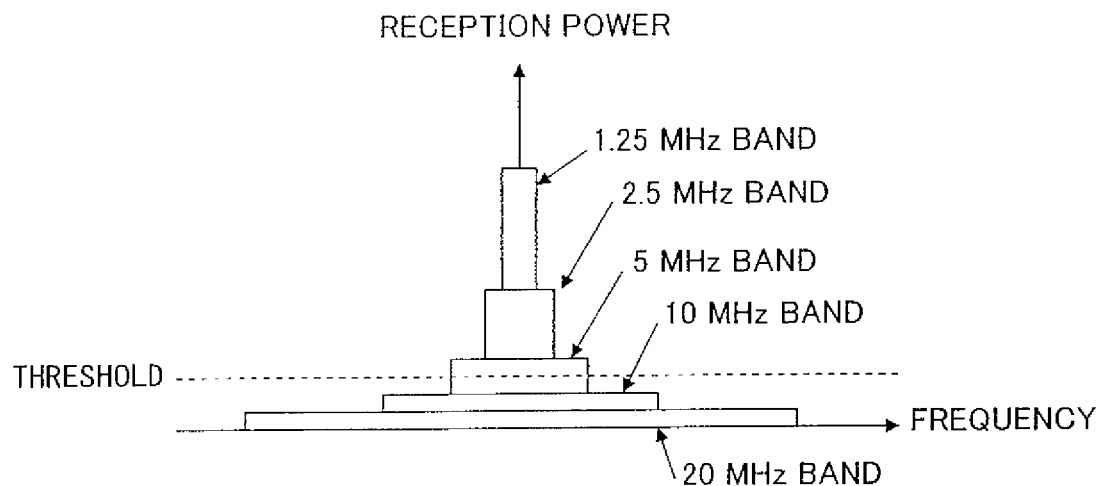
FIG. 5 schematically shows an exemplary aspect of a transmission bandwidth determination.
FIG. 6 shows an exemplary correspondence between channel quality and MCS numbers.

FIG. 5 shows an aspect of determination of the optimal transmission bandwidth. As a result of correcting the average reception power with instantaneous channel quality indicator, the reception power $D_{i,w}'$ is first obtained. Hence, it is assumed that the relationship between the bandwidth and the reception power is established as illustrated in FIG. 5. Also, it is assumed that the predetermined threshold is provided as the dotted line. In this embodiment, the transmission bandwidth is selected to make the reception power level per unit band at a base station higher than the threshold and to obtain as a wide band as possible. In the illustrated embodiment, the three bandwidths 1.25 MHz, 2.5 MHz and 5 MHz are selected as bandwidth candidates having reception power level higher than the threshold, and the widest 5 MHz bandwidth is determined as the transmission bandwidth among the candidate bandwidths. Note that the transmission bandwidth may be selected to have the reception power level lower than the threshold and as narrow a band as possible depending on the adopted threshold setting method. In either case, it is desirable that a wider bandwidth be obtained from the viewpoint of enhancement of fading tolerance using frequency diversity. Also, the reception power of a base station must have a reasonably high level in order to make the reception quality at the base station higher than or equal to a certain level. In this case, it is desirable that the bandwidth be selected to have a lower reception power at the base station from the viewpoint of lower peak power of signals.

Figure 7:
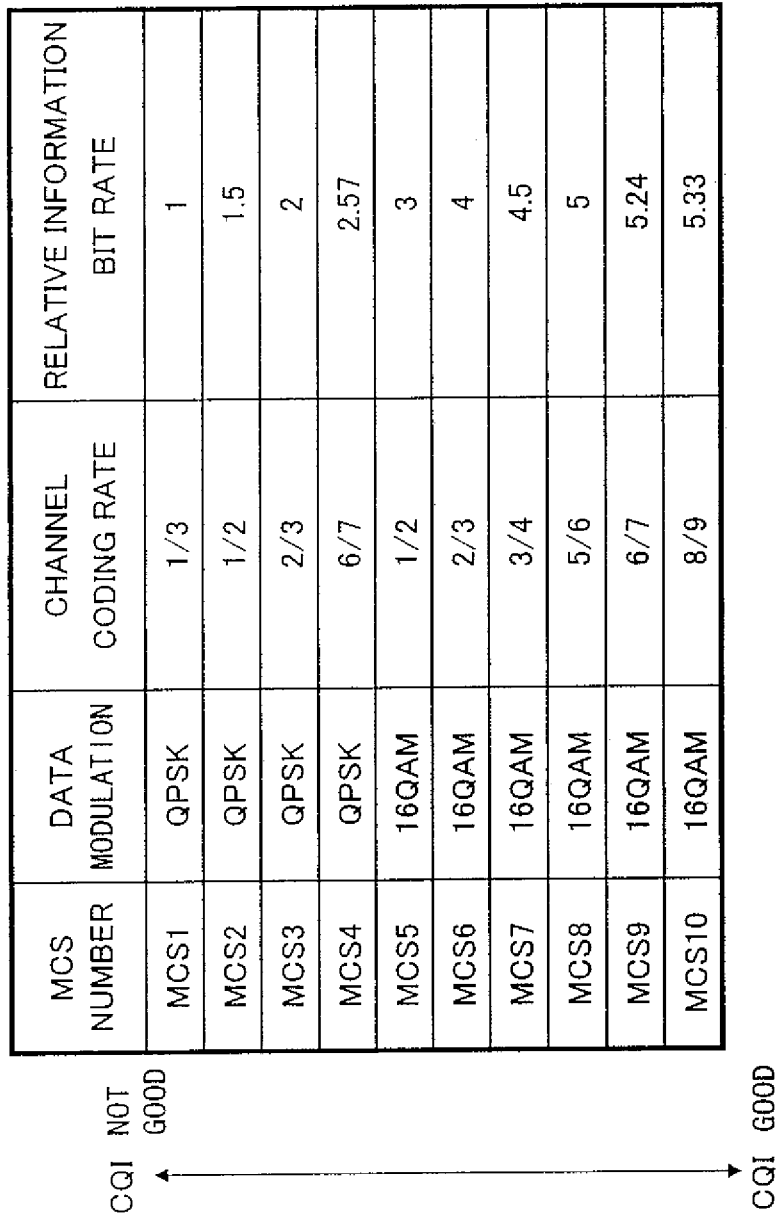
FIG. 7 shows an exemplary MCS table.

At step S5 in FIG. 3, the modulation level and the channel coding rate are determined based on the instantaneous value $CQI_t$ of the channel quality indicator and the transmission bandwidth. In this embodiment, combinations of the modulation levels and the channel coding rates are predefined, and each of the combinations can be identified by specifying the MCS number $MCS_1, \ldots, MCS_x$ in an MCS table. The correspondence between the channel quality indicator and the MCS numbers is predefined as illustrated in FIG. 6. FIG. 7 shows an exemplary MCS table and exemplary combinations between the modulation levels and the channel coding rates. In the illustrated example, the combination is defined such that the higher MCS number may lead to the relatively higher bit rate.

At step S6 in FIG. 3, the base station reports the set of transmission parameters including the transmission power, the transmission bandwidth and the MCS number as determined at steps S3, S4 and S5 to the mobile station over a downlink control channel. The mobile station demodulates the downlink control channel and sets the channel coding rate, the modulation level, the transmission bandwidth and the transmission power in accordance with the transmission parameters.

According to this embodiment, the transmission bandwidth and the MCS number are changed over time based on the instantaneous value of the channel quality indicator, and thus the illustrated embodiment of the present invention is preferred from the viewpoint of the transmission band being efficiently used in the overall system. In this embodiment, while the data rate is changed over time, the transmission power is kept constant as an average. Thus, the illustrated embodiment is particularly advantageous to non real-time data communications where the real time characteristics are relatively not demanded.

According to this embodiment, the transmission power and the transmission bandwidth together with the AMC are controlled, and thus the number of combinations of uplink transmission parameters can be significantly increased. As a result, the set of transmission parameters can be further suitably combined depending on the channel quality. If only the AMC and the transmission power are controlled, there are options of reduced transmission power and higher MCS number under the good channel quality. According to this embodiment, however, another option for modification of the transmission bandwidth is provided. There is a tendency under a given transmission power level that the wider bandwidth leads to reduction in the transmission power per unit band or reduction in the reception power at a base stations and narrower bandwidth leads to increase in the transmission power per unit band or increase in the reception power at a base station. Under worse channel quality, instead of increasing in the power per unit band by maintaining the bandwidth while increasing the transmission power, the power per unit band may be increased by reducing the bandwidth. Alternatively, only the transmission bandwidth may be made narrower under better channel quality except for the above-mentioned options without an increase in the transmission power or the MCS number. In this manner, the system resources can be conserved without modification of the transmission rate. These are simply instances and various sets of transmission parameters may be combined.

Note that when a base station derives a set of transmission parameters, it may be considered whether an error rate is high or low and/or whether the throughput is sufficient or insufficient in addition to the channel quality indicator CQI. For example, after a set of transmission parameters is derived in accordance with the above-mentioned method, the transmission power and/or others may be modified based on the error rate. Also, the diffusion rate of diffusion codes may be adjusted depending on the transmission bandwidth.

Second Embodiment

FIG. 8 is a flowchart of another transmission parameter determination method according to one embodiment of the present invention. The flow starts with step S0 where pilot channels are received from individual mobile stations over uplinks. At step S1, the reception quality or an instantaneous value of the channel quality indicator is measured based on the reception power level of a pilot channel.

At step S2, the instantaneous values of the channel quality indicator are being measured over a certain duration, and the time average value of the channel quality indicator is computed.

At step S3, the transmission power of data channels transmitted by a mobile station is determined based on the time average value of the channel quality. In this case, margins of the transmission power of the individual mobile station may be considered together with the time average value of the channel quality. The transmission power of the mobile station is determined with reference to a lookup table as illustrated in FIG. 4. More specifically, the transmission power is determined by identifying the $CQI_i$ corresponding to the time average value of the channel quality indicator and finding the transmission power $PT_i$ corresponding to the identified $CQI_i$.

In this embodiment, at step S3, the transmission bandwidth is further derived based on the average value $CQI_i$ of the channel quality indicator. In other words, the reception power $D_{i,w}$ per unit band at a base station is derived corresponding to the average value $CQI_i$ of the channel quality indicator and the determined transmission power $PT_i$, and then the transmission bandwidth is derived based on the relationship between the reception power $D_{i,w}$ and a predefined threshold. The method illustrated in FIG. 5 can be applied to derive the transmission bandwidth from the reception power $D_{i,w}$.

At step S4, the modulation level and the channel coding rate are determined based on the instantaneous value $CQI_t$ of the channel quality indicator.

At step S5, the base station reports the set of transmission parameters including the transmission power, the transmission bandwidth and the MCS number determined at steps S3 and S4 to the mobile station over a downlink control channel. The mobile station demodulates the downlink control channel and sets the channel coding rate, the modulation level, the transmission bandwidth and the transmission power in accordance with an instruction on the transmission parameters.

In this embodiment, the transmission bandwidth is not instantaneously changed and is determined as an average. The illustrated embodiment is preferred from the viewpoint of applicability to existing systems with the AMC in a fixed bandwidth.

Third Embodiment

FIG. 9 is a flowchart of another transmission parameter determination method according to one embodiment of the present invention. The flow starts with step S0 where pilot channels are received from individual mobile stations. At step S1, the reception quality or instantaneous values of the channel quality indicators are measured based on the reception power level of the pilot channels.

At step S2, the instantaneous values of the channel quality indicator are being measured over a certain duration, and then the time average value of the channel quality indicator is computed.

At step S3, the transmission bandwidth and the MCS number of a data channel to be transmitted by a mobile station is determined based on the time average value of the channel quality. In this case, margins of the transmission power of the individual mobile stations together with the time average value of the channel quality indicator may be considered. The transmission bandwidth of the mobile stations is derived with reference to a lookup table as illustrated in FIG. 4. More specifically, the reception power $D_{i,w}$ per unit band at a base station is derived corresponding to the average value $CQI_i$ of the channel quality indicator, and the transmission bandwidth is derived from the relationship between the reception power $D_{i,w}$ and a predefined threshold. The method as illustrated in conjunction with FIG. 5 can be applied to derive the transmission bandwidth from the reception power $D_{i,w}$.

At step S3 of this embodiment, the MCS number is further derived based on the average value $CQI_i$ of the channel quality indicator. The relationship between the average value of the channel quality and the MCS number can be predefined, and the MCS number can be derived from the relationship.

At step S4, the transmission power of the mobile station is derived from the instantaneous value $CQI_t$ of the channel quality indicator. The relationship between the instantaneous value of the channel quality and the transmission power can be predefined, and the transmission power can be derived from the relationship.

At step S5, the base station reports a set of transmission parameters including the transmission power, the transmission bandwidth and the MCS number determined at steps S3 and S4 to the mobile station over a downlink control channel. The mobile station demodulates the downlink control channel and sets the channel coding rate, the modulation level, the transmission bandwidth and the transmission power in accordance with the transmission parameters.

In this embodiment, the transmission bandwidth and the MCS number are not instantaneously changed but determined as an average. Thus, since the data rate is kept relatively constant, the illustrated embodiment is particularly advantageous to real time communications, for example.

Fourth Embodiment

FIG. 10 is a flowchart of another transmission parameter determination method according to one embodiment of the present invention. The flow starts with step S0 where pilot channels are received from individual mobile stations over uplinks. At step S1, the reception quality or instantaneous values of the channel quality are measured based on the reception power level of the pilot channels.

At step S2, instantaneous values of the channel quality indicator are measured over a certain duration, which may typically range from 10 ms to 1 second, and the time average value of the channel quality indicator is computed.

At step S3, the MCS number for a data channel transmitted by a mobile station is determined based on the time average value of the channel quality. In this case, margins of the transmission power of the individual mobile stations together with the time average value of the channel quality indicator may be considered.

At step S4, the transmission power of the mobile station is derived from the instantaneous value $CQI_t$ of the channel quality indicator and the determined MCS number.

At step S5, the transmission bandwidth is determined based on the instantaneous value $CQI_t$ of the channel quality indicator and the determined transmission power.

At step S6, the base station reports a set of transmission parameters including the transmission power, the transmission bandwidth and the MCS number to the mobile station over a downlink control channel. The mobile station demodulates the downlink control channel and sets the channel coding rate, the modulation level, the transmission bandwidth and the transmission power in accordance with the transmission parameters.

According to this embodiment, while the data rate is kept constant, the transmission power and the transmission bandwidth are instantaneously changed. Thus, the illustrated embodiment is particularly advantageous to communications, such as sound communications, where real time communications are in relatively high demand.

Figures 12, 13:
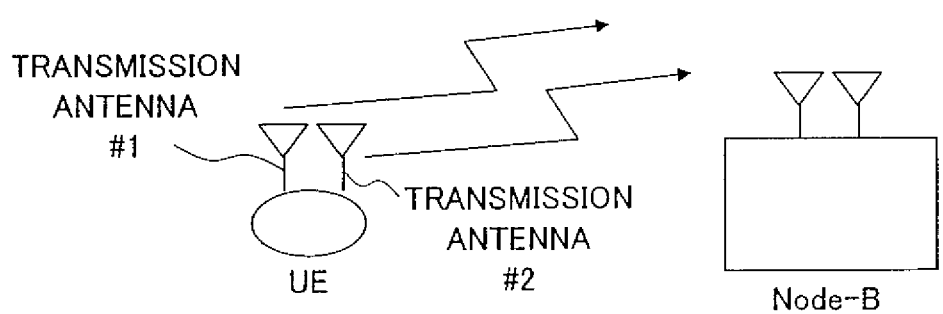
FIG. 12 shows an exemplary comparison table of first through fourth embodiments.
FIG. 13 shows an exemplary single user MIMO scheme.

FIG. 12 shows exemplary comparisons among the different methods of determining the transmission power, the transmission bandwidth and the modulation schemes according to the first through the fourth embodiments of the present invention. In the illustration, the term "LOW" used herein means that the level of an item, such as the transmission power, in the top row of each column is determined under low speed control, that is, the level is determined under control with long-periodic time average value of the channel quality indicator. The term "HIGH" used herein means that the level of an item in the top row of each column is determined under high speed control, that is, the level is adaptively determined under control with the instantaneous values of the channel quality indicator.

Fifth Embodiment

In the first through the fourth embodiments, the set of transmission parameters is independently determined for each mobile station. In the fifth embodiment of the present invention, the transmission bandwidth is determined for the individual mobile stations in consideration of the relationship among the multiple mobile stations.

Figures 11A, 11B:
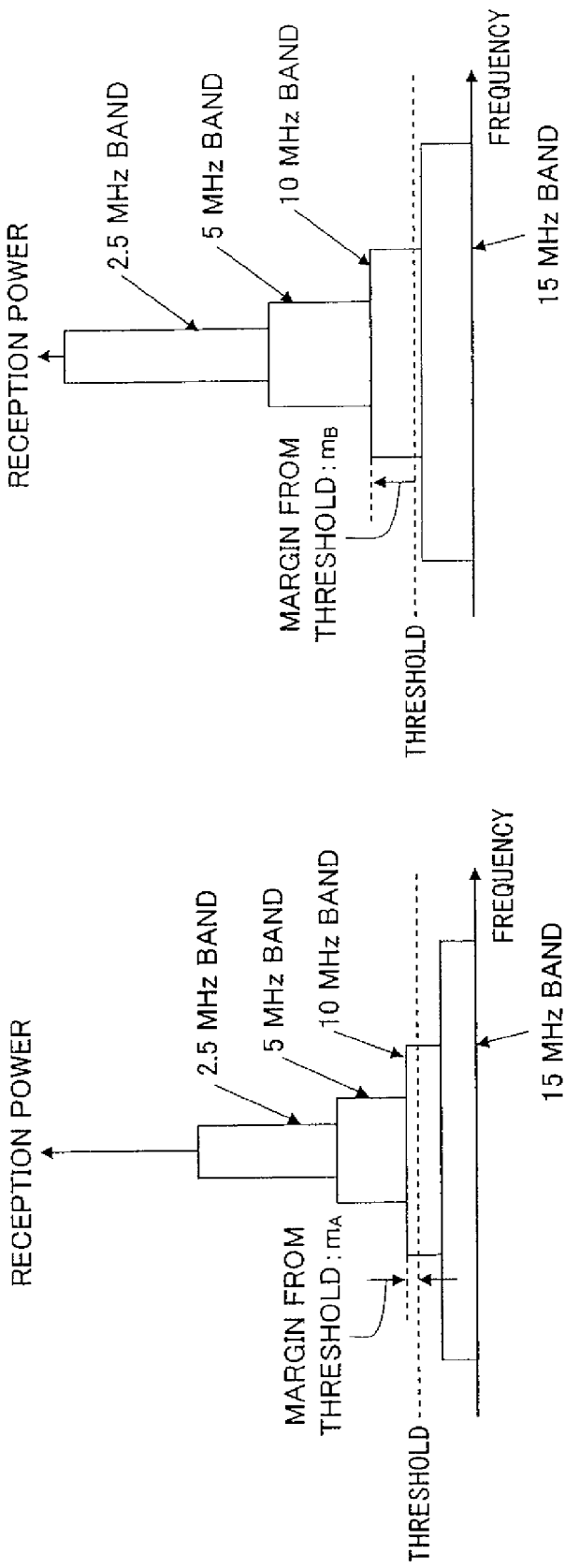
FIG. 11 schematically shows an exemplary aspect of a transmission bandwidth determination taking into account multiple mobile stations.

FIG. 11 shows an aspect of a transmission bandwidth determination method according to this embodiment. For illustration, it is assumed that the bandwidths 2.5 MHz, 5 MHz, 10 MHz and 15 MHz are provided to uplinks for the system. Then, it is also assumed that users A and B have the relationship as illustrated in FIGS. 11A and 11B with respect to the respective reception powers per unit band at a base station. Under these assumptions, the greatest one in candidate bandwidths greater than a predefined threshold would have 10 MHz for both of the users A and B. Thus, if the bandwidth of the overall system has greater than or equal to 20 MHz, the bandwidth of 10 MHz can be assigned for each of the users A and B. However, if the available bandwidth of the overall system is 15 MHz, for example, the above assignment is not possible. This embodiment advantageously addresses such a situation.

In the illustrated situation, the margin $m_B$ of the user B from the threshold is greater than the margin $m_A$ of the user A ($m_B > m_A$). That means that the user B has a better channel quality and thus the base station can receive signals from the user B at higher quality. Hence, in this embodiment, a greater bandwidth of 10 MHz is assigned for the user B while a smaller bandwidth of 5 MHz is assigned for the user A. As a result, the transmission bandwidth can be efficiently assigned. While the user B with the better channel quality can receive the benefit of the diversity effect in a wider band, the user A can obtain higher power per unit band. As a result, it is possible to improve the transmission quality depending on the respective channel quality.

Sixth Embodiment

As stated in conjunction with the fifth embodiment, the transmission parameters of mobile stations may be independently determined for the individual mobile stations or may be adjusted for some of the mobile stations. Also, some schemes (1) to (3) as presented below are conceivable for the transmission power control.

(1) The transmission power of the mobile stations may be controlled such that the same reception power can be achieved at a base station for all the mobile stations. According to this scheme, all the mobile stations can achieve similar throughput and/or error rate, and thus the scheme is advantageous from the viewpoint of fairness among the mobile stations. However, the scheme has a disadvantage in that mobile stations on the cell border may significantly interfere with other cells.

(2) The transmission power of the mobile stations may be controlled such that all the mobile stations can transmit signals at the same transmission power. This scheme is advantageous in that the throughput within a cell can be maximized. On the other hand, there is a risk of reduction in the throughput of users at the cell border, and thus the fairness among the users may be lost.

(3) As an intermediate scheme between the schemes (1) and (2), the transmission power is controlled such that the reception power higher than or equal to a certain level can be achieved at a base station for all the mobile stations and signals transmitted from mobile stations in neighborhood of a base station can be received at the base station with higher power. According to this scheme, it is possible to improve the throughput in a cell with considerations of the fairness among the mobile stations.

Seventh Embodiment

The seventh through tenth embodiments of the present invention relate to multiple antennas systems or MIMO (Multiple Input Multiple Output) systems. In general, the MIMO systems are classified into single-user MIMO type systems and multiple-user MIMO type systems.

FIG. 13 shows the principle of the single-user MIMO type system. Although a base station (Node B) is shown for simplicity to have two reception antennas for receiving signals from a user terminal (UE) having two transmission antennas, the number of antennas is not limited to it and any number of antennas may be used. In the illustration, separate signals are simultaneously transmitted from the transmission antennas #1 and #2 of the user terminal (UE) at the same frequency band. The base station receives the spatially multiplexed signals and restores signal sequences transmitted from the different transmission antennas by performing a suitable signal separation method.

Figure 14:
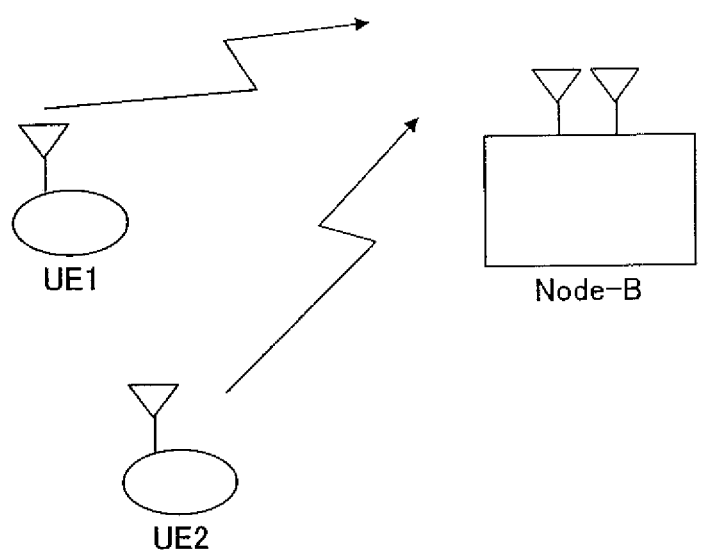
FIG. 14 shows an exemplary multiple user MIMO scheme.

FIG. 14 shows the principle of the multiple-user MIMO scheme. For simplicity, two user terminals (UE1, UE2) each have one or more transmission antennas and transmit separate signals. The spatially multiplexed signals are received at the base station. The base station performs a suitable signal separation method on the received signals and restores different signal sequences transmitted from each of the communication terminals.

In any case of the single-user MIMO or the multiple-users MIMO, the base station receives different signals within the same band simultaneously and separates the signals with a signal separation method to restore respective uplink signals. As is described below, the present invention may be applied to uplink signals in a multiple antennas system. It is assumed that a common frequency band is used among multiple transmission antennas or multiple users.

Figure 15:
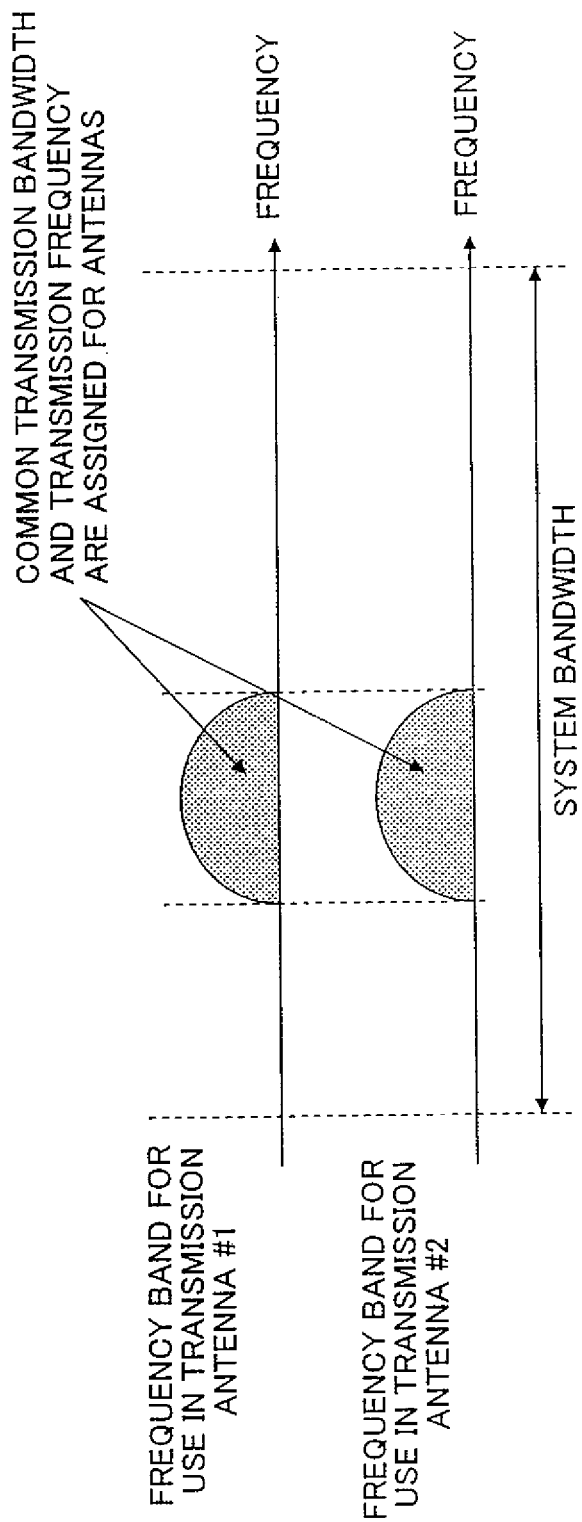
FIG. 15 shows a frequency band in the single user MIMO scheme.

FIG. 15 shows that respective signals transmitted from the first transmission antenna #1 and the second transmission antenna #2 have the same frequency band in the single-user MIMO scheme. For example, if the frequency band assigned for the system (system bandwidth) is 20 MHz and 5 MHz is assigned for a certain user, the first transmission antenna #1 and the second transmission antenna #2 use the same frequency band of 5 MHz.

Figure 16:
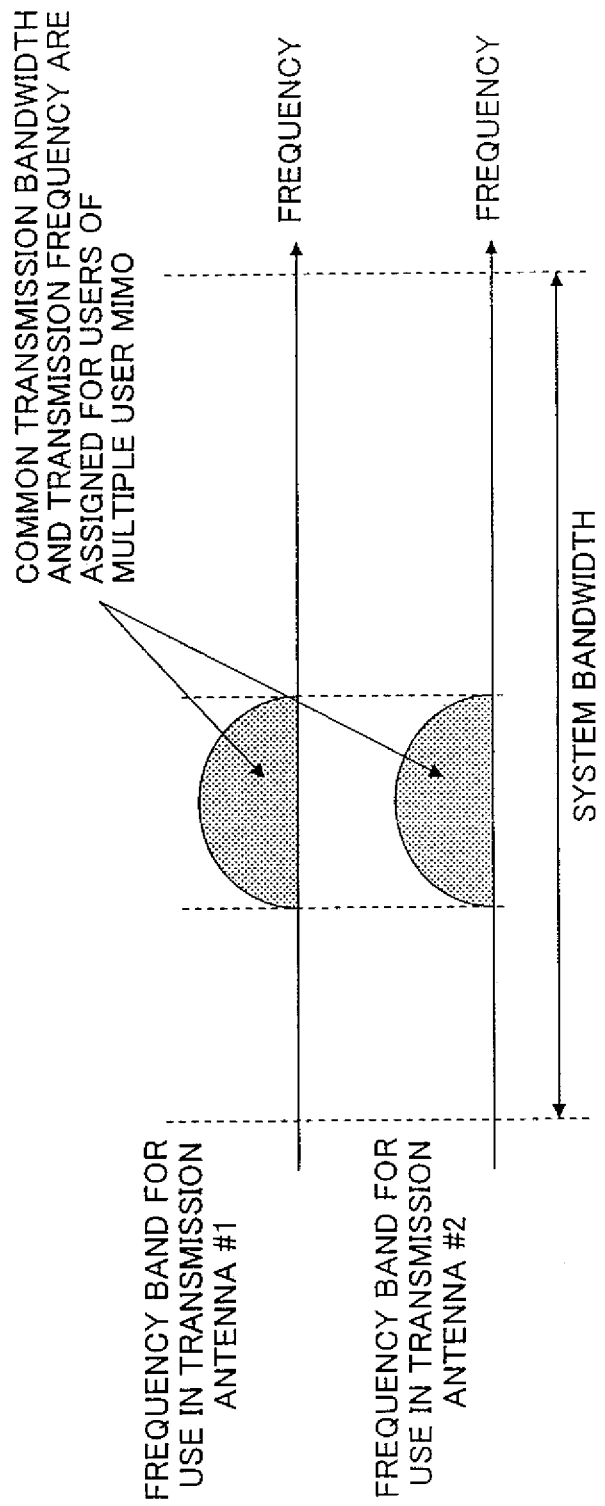
FIG. 16 shows a frequency band in the multiple user MIMO scheme.

FIG. 16 shows that respective signals transmitted from the user 1 and the user 2 have the same frequency band. For example, it is assumed that the frequency band of 20 MHz is assigned for the system and that the same frequency band of 5 MHz is assigned for the users 1 and 2.

Figure 17:
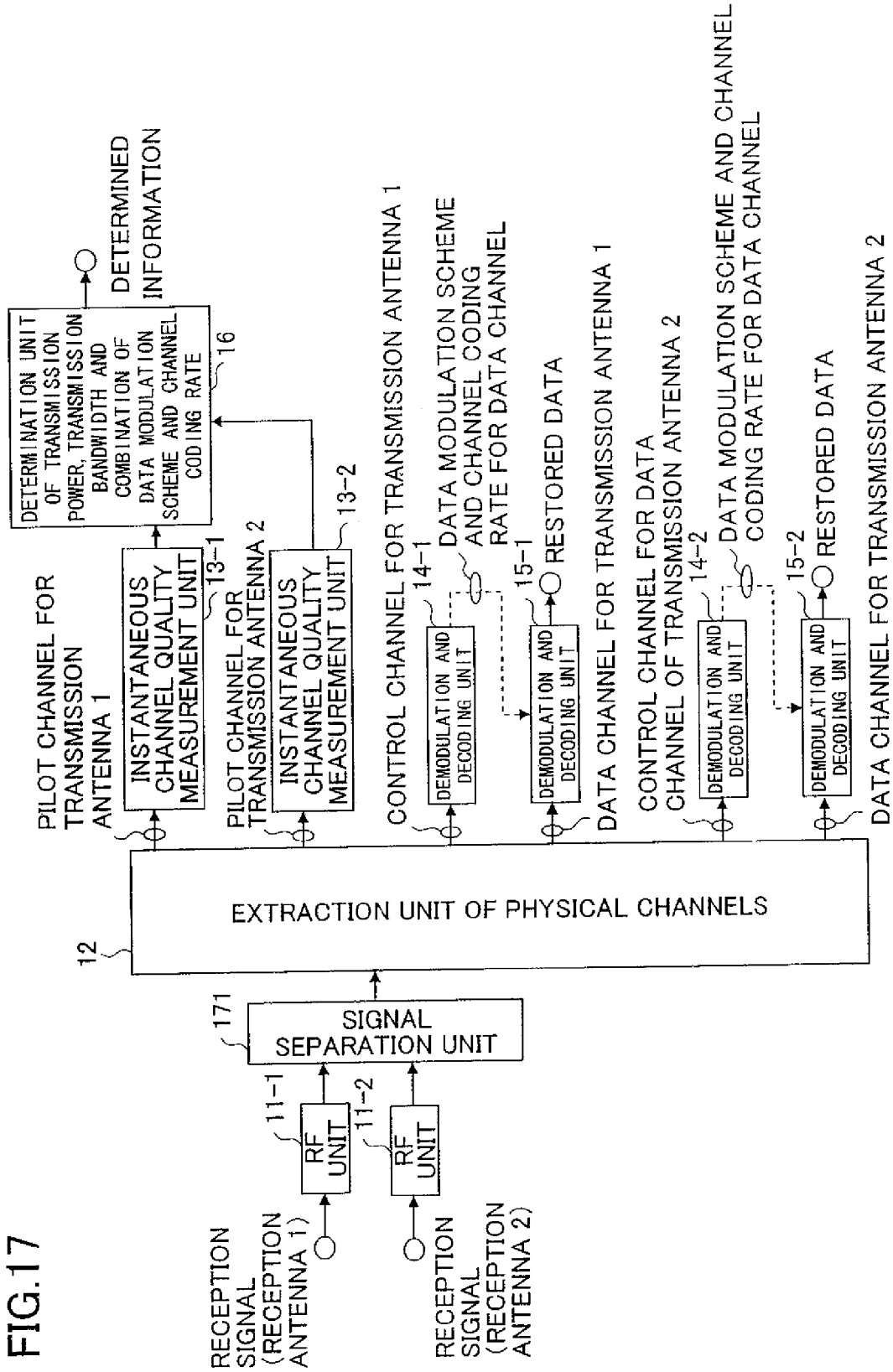
FIG. 17 is a schematic block diagram of a base station according to one embodiment of the present invention.

FIG. 17 is a schematic block diagram of a base station having two reception antennas. The base station includes radio frequency (RF) units 11-1 and 11-2, a signal separation unit 171, a signal extraction unit 12, channel quality measurement units 13-1 and 13-2, demodulation and decoding units 14-1, 15-1, 14-2 and 15-2 and a transmission parameter determination unit 16. For convenience, the base station includes the two antennas, but greater than two reception antennas may be used. Also, although the single-user MIMO scheme is described in detail below, the present invention can be applied to the multiple-user MIMO scheme.

The radio frequency units 11-1 and 11-2 perform various operations, such as frequency conversion, band limitation or analog-to-digital conversion, for conversion of radio packets transmitted from mobile stations and received via multiple reception antennas (not shown) into baseband signals.

The signal separation unit 171 obtains two signals transmitted from the transmission antennas #1 and #2 by applying some signal separation method to two spatially multiplexed and simultaneously received signals or data sequences.

The signal extraction unit 12 extracts and supplies a pilot channel, a shared packet control channel (also referred to as a "control channel") and a shared packet data channel (also referred to as a "data channel") from the separated transmitted signals. The pilot channel, the control channel and the data channel are time-multiplexed, frequency-multiplexed, code-multiplexed or multiplexed in a combination thereof for radio transmission from the transmission antennas. Thus, the signal extraction unit 12 also serves as a demultiplexer for separating the multiplexed signals properly.

The channel quality measurement units 13-1 and 13-2 are coupled to an output for the pilot channel of the signal extraction unit 12. The channel quality measurement units 13-1 and 13-2 evaluate the reception quality of the pilot channels for the corresponding transmission antennas and measure respective instantaneous values of the reception quality. The channel quality measurement units 13-1 and 13-2 average the instantaneous values of the reception quality over a certain duration, for example, ranging from 10 ms to 1 second, for each transmission antenna and compute the time average value of the reception quality to supply average channel quality.

The demodulation and decoding units 14-1, 14-2, 15-1 and 15-2 receive control channels and data channels from the signal extraction unit 12 for each transmission antenna. The demodulation and decoding units 14-1 and 14-2 demodulate and decode the control channels received from the respective antennas, extract some information items, such as the modulation level and the channel coding rate, required to demodulate the data channels, and transmit them to the demodulation and decoding units 15-1 and 15-2, respectively. The demodulation and decoding units 15-1 and 15-2 demodulate and decode the received data channels based on the transmitted control information for further processing such as data transmission.

The transmission parameter determination unit 16 is coupled to outputs of the channel quality measurement units 13-1 and 13-2. The transmission parameter determination unit 16 derives and supplies a set of transmission parameters associated with subsequent uplinks based on the instantaneous values and the time average value of the reception quality. The set of transmission parameters may include some parameters relating to uplink signal transmission such as the transmission power of mobile stations, the transmission bandwidth, the modulation level and the channel coding rate. Such a set of transmission parameters is derived at an appropriate frequency for each mobile station. The derived transmission parameters are reported to individual mobile stations over downlink control channels. A method of deriving the transmission parameters is described in detail below.

Figure 18:
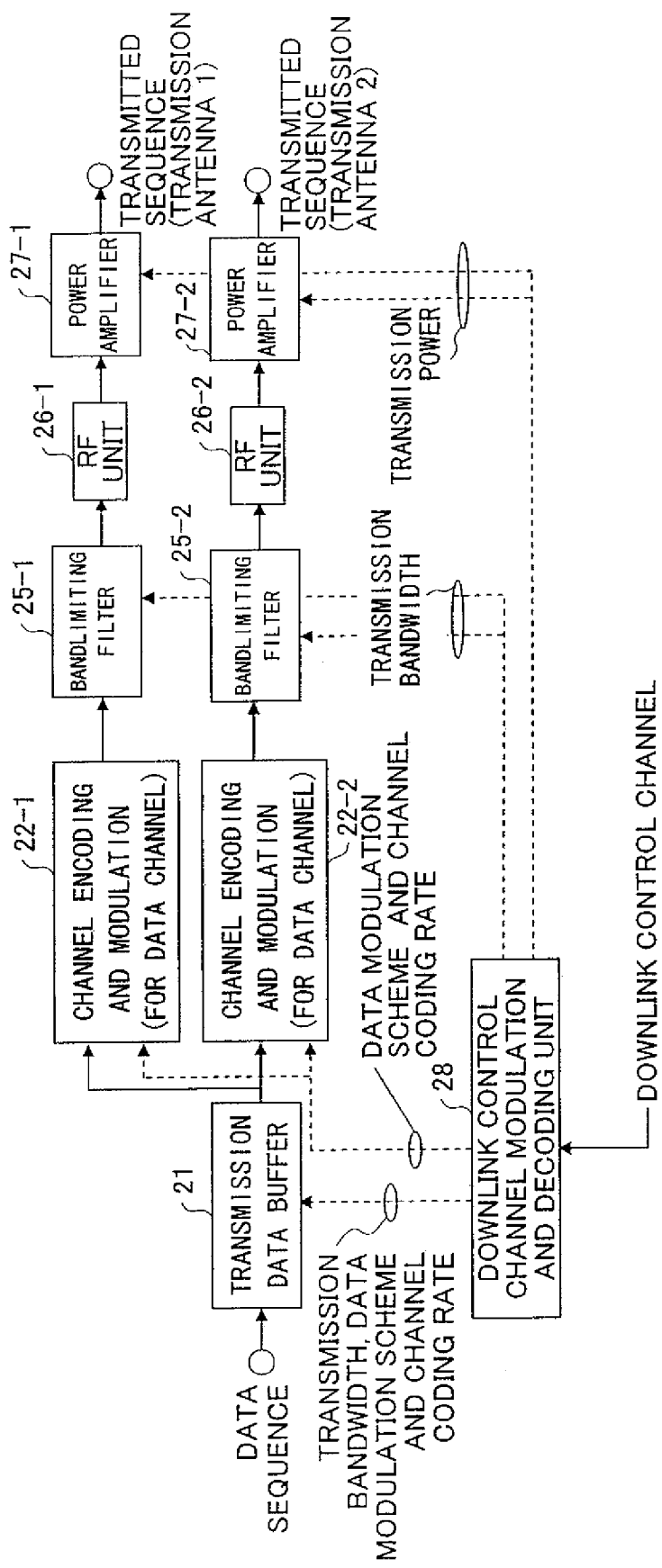
FIG. 18 is a schematic block diagram of a mobile station according to one embodiment of the present invention.

FIG. 18 is a schematic block diagram of a mobile station according one embodiment of the present invention. The mobile station includes a transmission buffer 21, encoding and modulation units 22-1 and 22-2, bandlimiting filters 25-1 and 25-2, radio frequency (RF) units 26-1 and 26-2, power amplification units 27-1 and 27-2 and a control channel demodulation and decoding unit 28. Note that no operational unit related to encoding and modulation for the control channels is shown for simplicity.

The transmission buffer 21 temporarily stores traffic data to be transmitted by a user and supplies the traffic data in accordance with a specified data rate.

The encoding and modulation units 22-1 and 22-2 are coupled to the transmission buffer 21 and channel encode and data modulate the data channels for the corresponding transmission antennas in order to fulfill the indicated data rate.

The bandlimiting filters 25-1 and 25-2 set the bandwidth of transmitted signals in accordance with the indications for each transmission antenna. In this embodiment, five bandwidths of 1.25 MHz, 2.5 MHz, 5 MHz, 10 MHz and 20 MHz are provided for the system, and one of the bandwidths is selected. As stated above, signals transmitted via two transmission antennas occupy the same frequency band.

The radio frequency (RF) units 26-1 and 26-2 perform various operations, such as digital-to-analog conversion or frequency conversion, for corresponding transmission antennas for conversion of radio signals into baseband signals.

The power amplification units 27-1 and 27-2 amplify the power of transmitted signals in accordance with indications for the corresponding transmission antennas.

The control channel demodulation and decoding unit 28 demodulates and channel decodes control channels received in downlinks and extracts from the control channels a set of transmission parameters including the transmission power, the transmission bandwidth, the modulation level and the channel coding rate. The demodulation and decoding unit 28 transmits the extracted transmission parameters to the transmission buffer 21, the encoding and modulation units 22-1 and 22-2, the bandlimiting filter units 25-1 and 25-2 and the power amplification units 27-1 and 27-2 for the corresponding transmission antennas.

Figure 19:
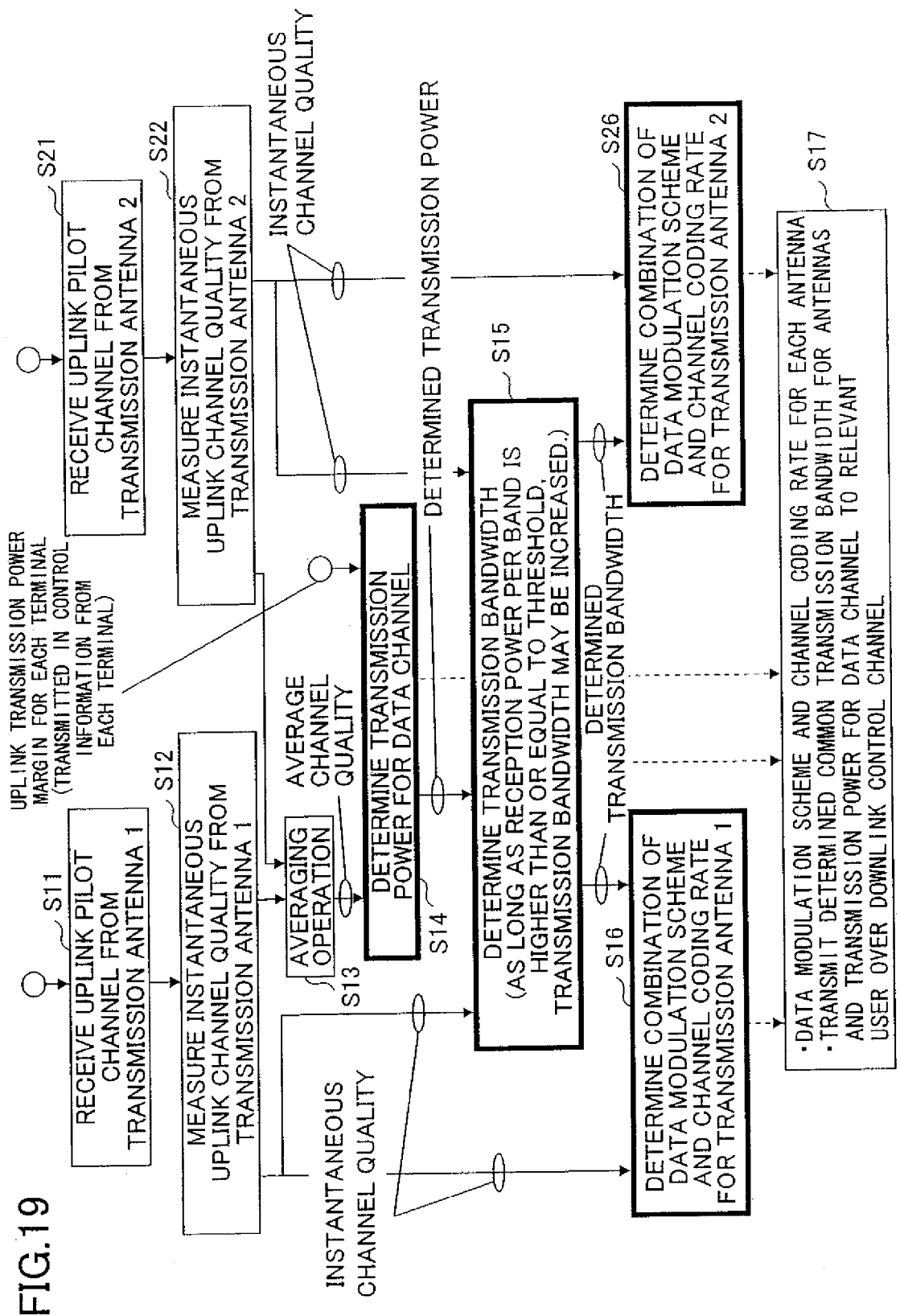
FIG. 19 is a flowchart (1) of a transmission parameter determination method according to one embodiment of the present invention.

FIG. 19 is a flowchart of a transmission parameter determination method according to one embodiment of the present invention. This flow is carried out in a base station, particularly in the channel quality measurement units 13-1 and 13-2 and the transmission parameter determination unit 16 in FIG. 17. The flow starts with steps S11 and S21 where uplink pilot channels transmitted from transmission antennas of mobile stations are received at two reception antennas of the base station. In the illustration, the flow corresponds to operations after some signal separation method. The uplinks include two types of uplinks, that is, an uplink from the first transmission antenna #1 and an uplink from the second transmission antenna #2. Although the single-user MIMO scheme is described below for simplicity, the present invention can be applied to the multiple-user MIMO scheme. Also in this case, the uplinks may include an uplink from user 1 and an uplink from user 2. At steps S11 and S21, instantaneous values of the reception quality or the channel quality are measured based on the reception power level of uplink pilot channels.

At steps S12 and S22, the instantaneous values of the channel quality indicator are measured over a certain duration, and the time average value of the channel quality indicator is computed based on the instantaneous values at step S13. The certain duration typically ranges from 10 ms to 1 second, but various durations may be used depending on applications. It is estimated that although the transmission antennas #1 and #2 may have different instantaneous values of the channel quality indicator, the respective average values may be similar. For this reason, step S13 is commonly carried out for each uplink.

At step S14, the transmission power for transmitting a data channel from a mobile station is determined based on the time average value of the channel quality. In this case, the margin associated with the transmission power of each mobile station together with the time average value of the channel quality indicator may be taken into account. This is why the mobile stations may have achievable transmission power levels different from each other depending on the performance thereof. In this embodiment, the transmission power of the mobile stations may be determined in accordance with the method described in conjunction with FIG. 4.

At step S15, the transmission bandwidth for uplink data channels is determined based on the transmission power $PT_i$ determined at step S14 and respective instantaneous values $CQI_t^{(1)}$, $CQI_t^{(2)}$ of the channel quality associated with different uplinks. In this embodiment, five bandwidths of 1.25 MHz, 2.5 MHz, 5 MHz, 10 MHz and 20 MHz are provided for uplinks. Among them, the most suitable one for the current channel quality is selected using the same method as described in conjunction with FIG. 4. The transmission power $PT_i$ obtained at step S14 is derived based on the time average value of the channel quality indicator, and thus the reception power $D_{i,W}$ of the base station estimated based on the transmission power $PT_i$ would also represent an average value. In this embodiment, the average reception power is further corrected with the instantaneous value $CQI_t$ of the channel quality indicator to derive instantaneous reception power $D_{i,W}$. Based on the derived reception power and a predefined threshold, the optimal instantaneous transmission bandwidth is derived.

At steps S16 and S26, the combination of the modulation level and the channel coding rate is determined for each uplink based on the instantaneous value $CQI_t$ of the channel quality indicator and the transmission bandwidth. In this embodiment, the combinations of the modulation level and the channel coding rate are predefined, and each combination can be identified by specifying the MCS number ($MCS_1, \ldots, MCS_x$) in an MCS table.

At step S17, the base station transmits a set of transmission parameters, such as the transmission power, the transmission bandwidth or the MCS number, determined for each uplink at steps S14, S15 and S16 to a mobile station. The mobile station demodulates the downlink control channel and sets the channel coding rater the modulation level, the transmission bandwidth and the transmission power for each transmission antenna in accordance with the transmission parameters.

According to this embodiment, the transmission bandwidth and the MCS number are instantaneously modified for each uplink based on the instantaneous values of the channel quality indicator, and thus the present embodiment is desirable from the viewpoint of efficient utilization of the transmission band as the overall system. In the present embodiment, while the data rate is instantaneously modified, the transmission power is kept constant as an average. Thus, the present embodiment is particularly advantageous to non-real time data communications and others where real time communication is not strongly demanded.

Figure 20:
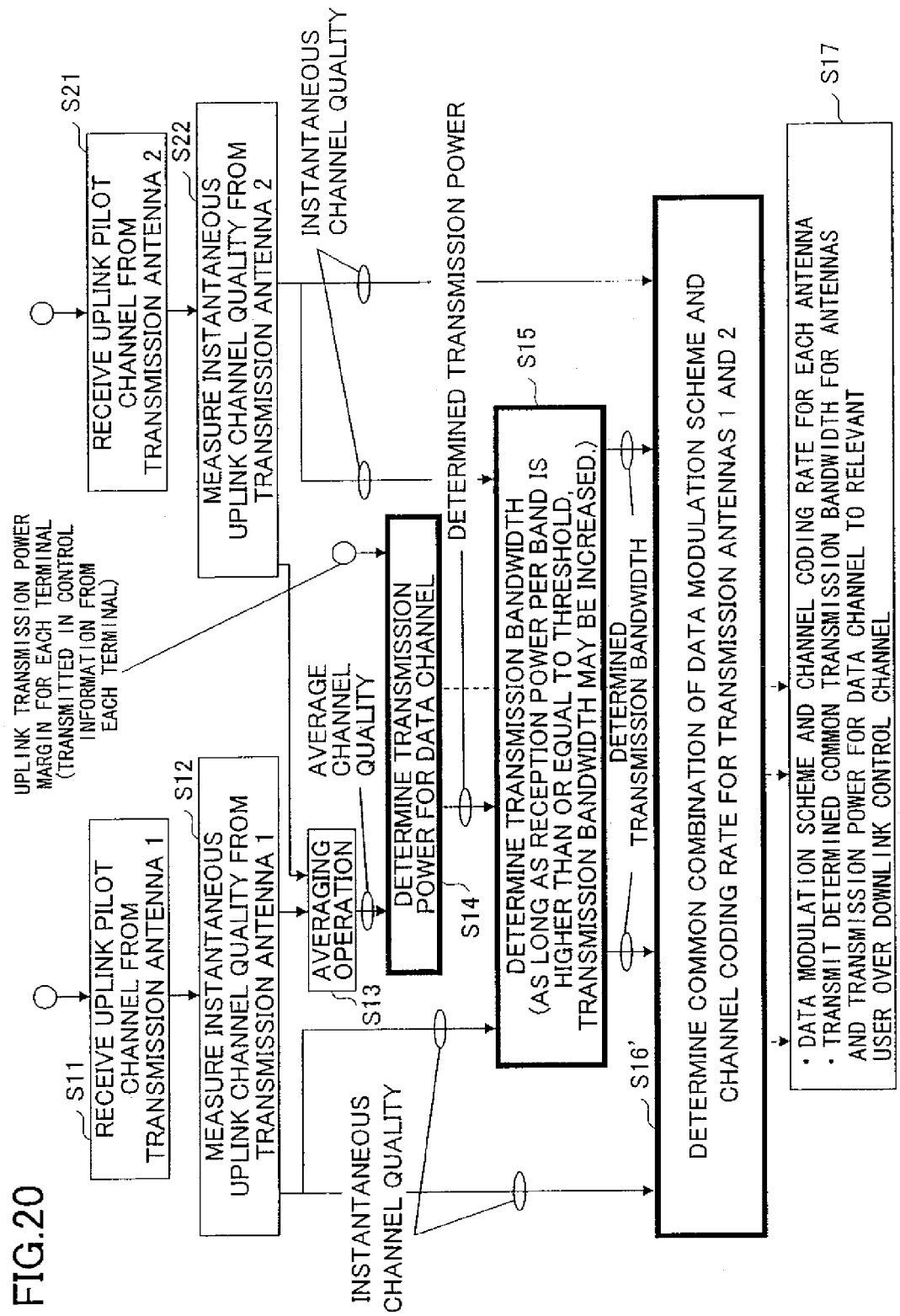
FIG. 20 shows a variation of the flowchart illustrated in FIG. 19.

FIG. 20 is a flowchart of another transmission parameter determination method according to one embodiment of the present invention. Although this flow is roughly similar to the flow described in conjunction with FIG. 19, they may differ in step S16'. At step S16' of the present flow, the MCS number for common use in both uplinks (transmission antennas #1 and #2) is determined based on the instantaneous channel quality values evaluated for the transmission antennas #1 and #2 and the determined transmission bandwidth. As a result, it is possible to reduce the number of control bits for control channels (signaling channels) in AMC control.

Eighth Embodiment

Figure 21:
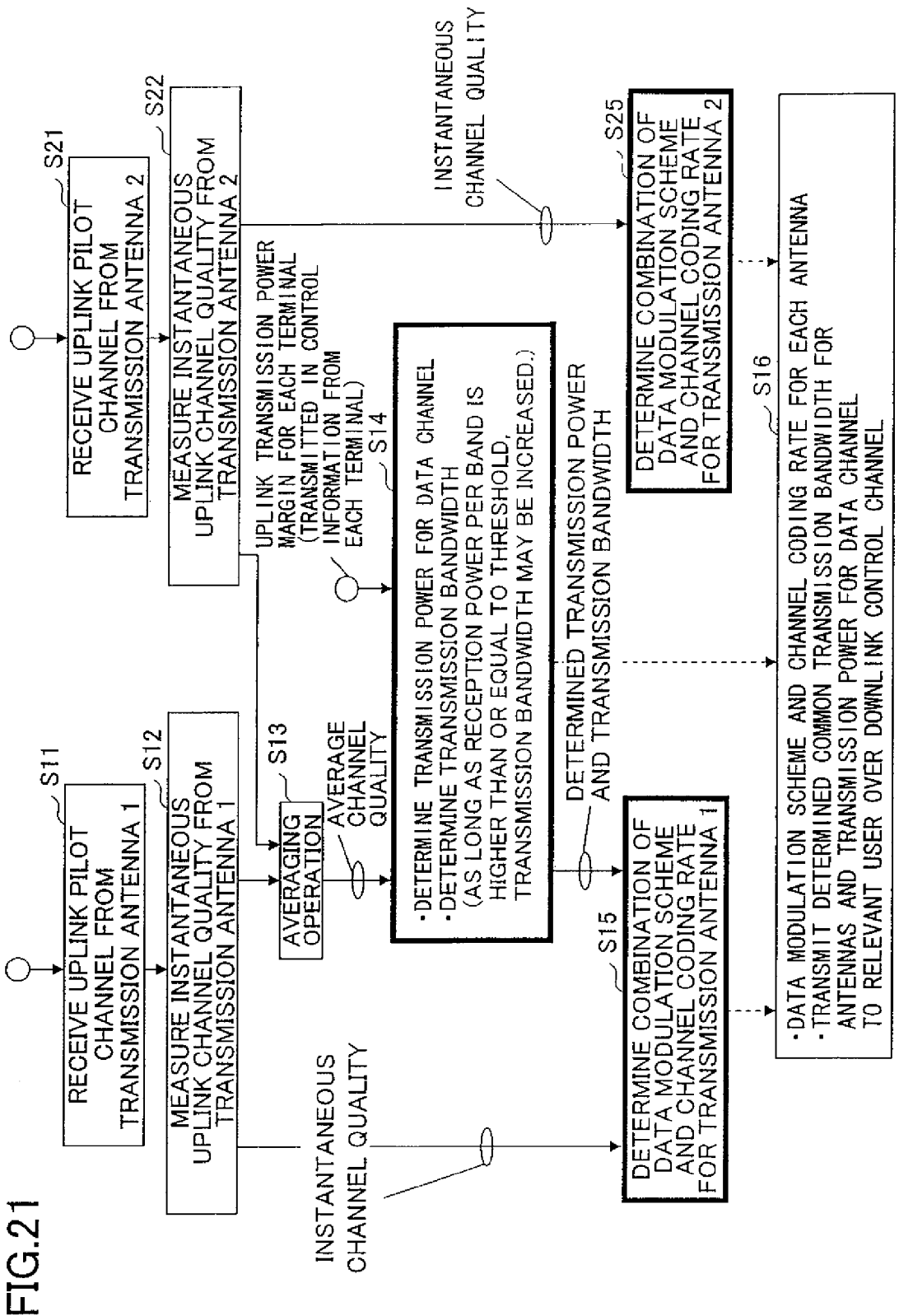
FIG. 21 is a flowchart (2) of a transmission parameter determination method according to one embodiment of the present invention.

FIG. 21 is a flowchart of another transmission parameter determination method according to one embodiment of the present invention. This flow starts with steps S11 and S21 where uplink pilot channels are received from transmission antennas of mobile stations. At steps S12 and S22, instantaneous values of the reception quality or the channel quality indicator are measured based on the reception power level of the pilot channels.

At step S13, the instantaneous values of the channel quality indicator are being measured in a certain duration, and the time average value of the channel quality indicator is computed.

At step S14, the transmission power for transmitting data channels from each antenna of mobile stations is determined based on the time average value of the channel quality. In this case, the margin of the transmission power associated with each mobile station together with the time average value of the channel quality may be taken into account. The transmission power of the mobile stations may be determined with reference to a lookup table illustrated in FIG. 4. More specifically, the transmission power may be determined by identifying $CQI_i$ corresponding to the time average value of the channel quality indicator and detecting the transmission power $PT_i$ corresponding to the identified $CQI_i$.

In this embodiment, at step S14, the transmission bandwidth is also derived based on the average value $CQI_i$ of the channel quality indicator.

At steps S15 and S25, the combination of the modulation level and the channel coding rate is determined for the corresponding transmission antennas based on the instantaneous value $CQI_t$ of the channel quality indicator and the transmission bandwidth. In this embodiment, combinations of the modulation levels and the channel coding rates are predefined, and each of the combinations is identified by specifying the MCS number ($MCS_1, \ldots, MCS_x$) in an MCS table.

At step S16, a base station transmits a set of transmission parameters, such as the transmission power, the transmission bandwidth and the MCS number, determined at steps S14, S15 and S25 for each uplink to a mobile station. The mobile station demodulates downlink control channels and sets the channel coding rate, the modulation level, the transmission bandwidth and the transmission power for each transmission antenna in accordance with the transmission parameters.

In this embodiment, the transmission bandwidth is determined as an average without instantaneous modification. The present embodiment is preferred from the viewpoint of easy application to existing systems where the AMC is carried out at a fixed bandwidth.

Figure 22:
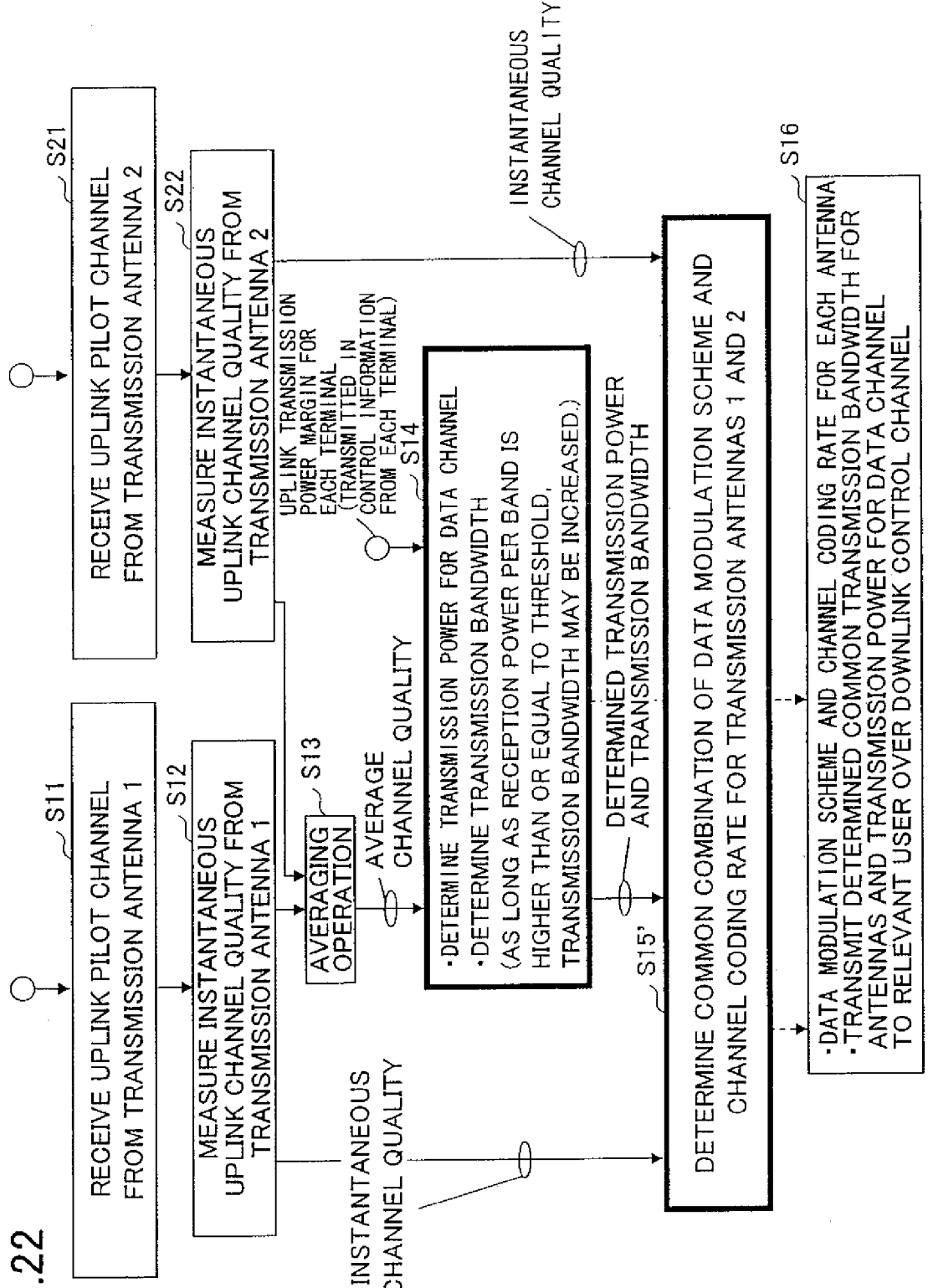
FIG. 22 shows a variation of the flowchart illustrated in FIG. 21.

FIG. 22 is a flowchart of another transmission parameter determination method according to one embodiment of the present invention. Although this flow is roughly similar to the flow described in conjunction with FIG. 21, they may differ in step S15'. At step S15' of the present flow, the MCS number for common use in both of the transmission antennas #1 and #2 is used based on instantaneous channel quality values measured for the transmission antennas #1 and #2 and the determined transmission bandwidth. As a result, it is possible to reduce the number of control bits for control channels in AMC control.

Ninth Embodiment

Figure 23:
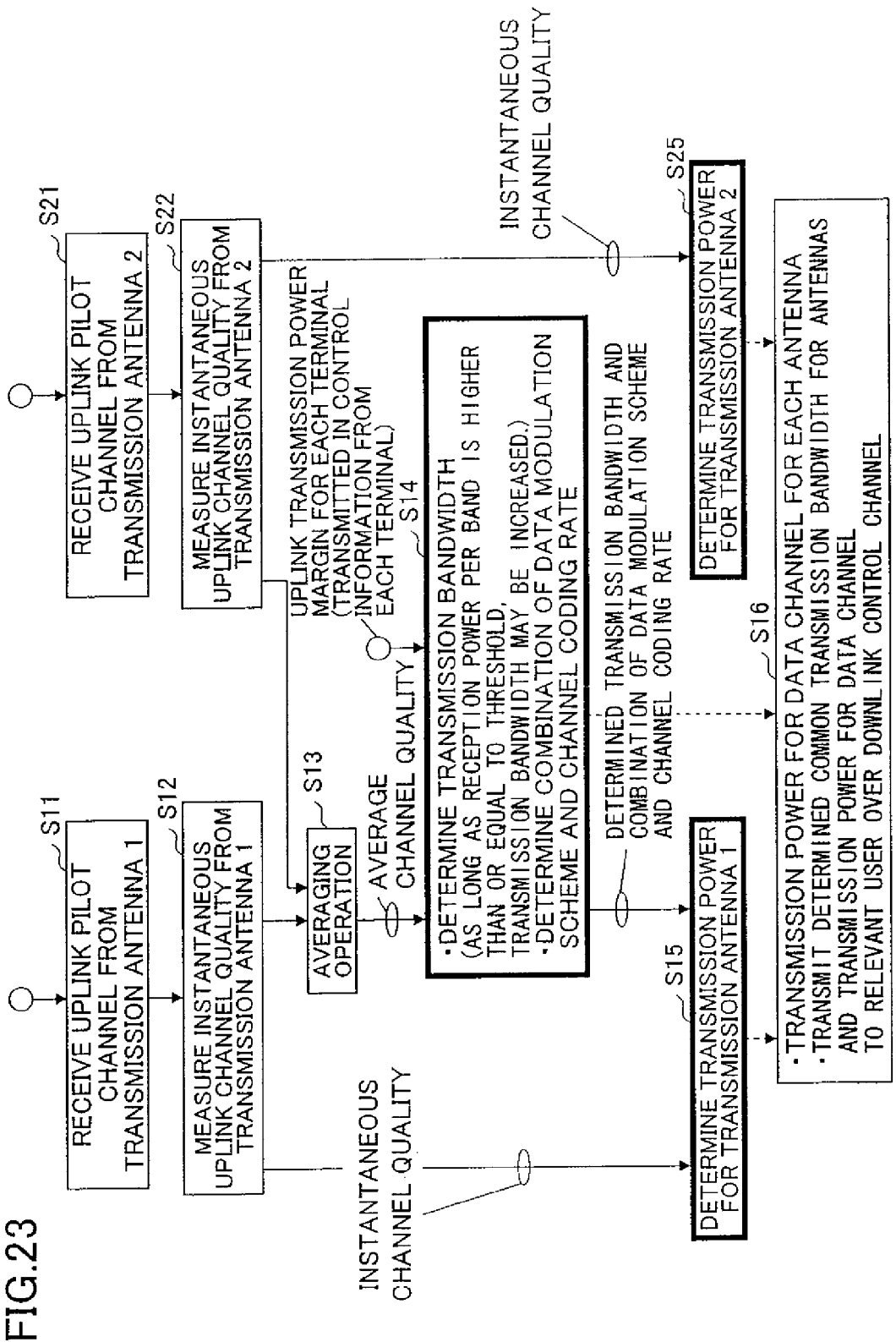
FIG. 23 is a flowchart (3) of a transmission parameter determination method according to one embodiment of the present invention.

FIG. 23 is a flowchart of another transmission parameter determination method according to one embodiment of the present invention. This flow starts with steps S11 and S21 where uplink pilot channels are received from transmission antennas of mobile stations. At steps S12 and S22, instantaneous values of the reception quality or the channel quality indicator are measured for each uplink based on the reception power level of pilot channels.

At step S13, the instantaneous values of the channel quality indicator are being measured in a certain duration, and the time average value of the channel quality indicator is computed.

At step S14, the transmission bandwidth for transmitting data channels from a mobile station is determined based on the time average of the channel quality. In this embodiment, at step S14, the MCS number (the modulation level and the channel coding rate) is also derived based on the average value $CQI_t$ of the channel quality indicator, the correspondence between the average values of the channel quality and the MCS numbers can be predefined, and the MCS number can be derived from the correspondence.

At steps S15 and S25, the transmission power levels associated with the corresponding transmission antennas of the mobile station is derived from the instantaneous value $CQI_t$ of the channel quality indicator.

At step S16, a base station transmits a set of transmission parameters including the transmission power, the transmission bandwidth and the MCS number determined at steps S14, S15 and S25 for each uplink to a mobile station. The mobile station demodulates downlink control channels and sets the channel coding rate, the modulation level, the transmission bandwidth and the transmission power for each transmission antenna in accordance with the transmission parameters.

In this embodiment, the transmission bandwidth and the MCS number are determined as an average without instantaneous modification. Thus, since the data rate is kept relatively constant, the present embodiment is particularly advantageous to real time communications, for example.

Figure 24:
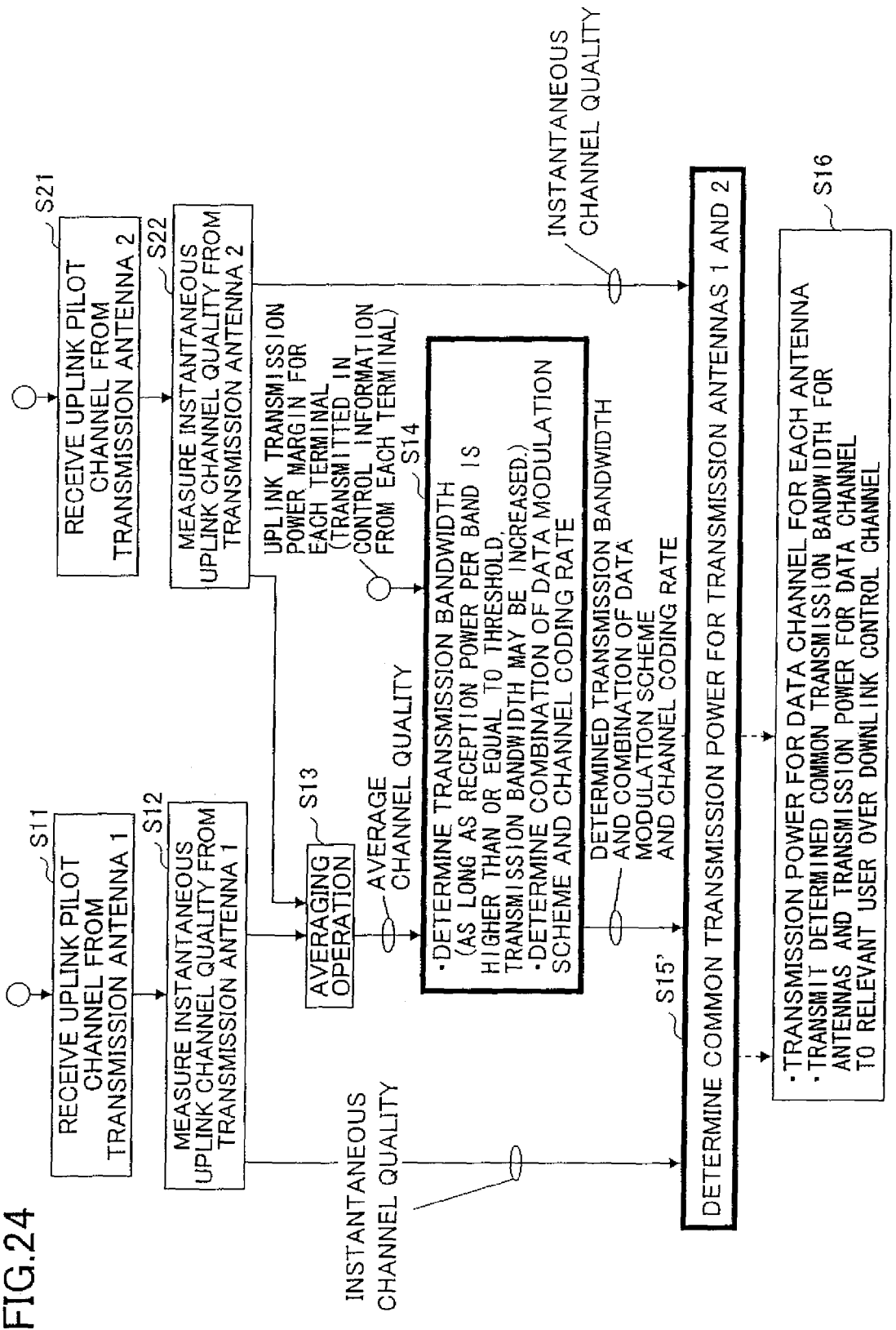
FIG. 24 shows a variation of the flowchart illustrated in FIG. 23.

FIG. 24 is a flowchart of another transmission parameter determination method according to one embodiment of the present invention. Although this flow is roughly similar to the flow described in conjunction with FIG. 23, they may differ in step S15'. At step S15' of the present flow, the transmission power for common use in both of the transmission antennas #1 and #2 is determined based on instantaneous channel quality values measured for the transmission antennas #1 and #2, the determined transmission bandwidth and the MCS number. As a result, it is possible to reduce the number of control bits for control channels in AMC control.

Tenth Embodiment

FIG. 25 is a flowchart of a transmission parameter determination method according to one embodiment of the present invention. This flow starts with steps S11 and S21 where uplink pilot channels are received from transmission antennas of mobile stations. At steps S12 and S22, instantaneous values of the reception quality or the channel quality are measured for corresponding uplinks based on the reception power level of pilot channels.

At step S13, the instantaneous values of the channel quality indicator are being measured in a certain duration, which may typically range from 10 ms to 1 second, and the time average value of the channel quality indicator is computed.

At step S14, the MCS number for use in transmission of data channels from a mobile station is determined for each uplink based on the time average value of the channel quality.

At steps S15 and S25, the transmission power associated with each uplink is derived from the instantaneous values of the channel quality indicator associated with the corresponding transmission antenna and the determined MCS number.

At step S16, a base station transmits a set of transmission parameters including the transmission power, the transmission bandwidth and the MCS number determined at steps S14, S15 and S25 for each uplink to a mobile station. The mobile station demodulates the downlink control channel and sets the channel coding rate, the modulation level, the transmission bandwidth and the transmission power for each transmission antenna in accordance with the transmission parameters.

In this embodiment, while the data rate is kept constant, the transmission power associated with each transmission antenna is instantaneously modified. Thus, the present embodiment is particularly advantageous to communications, such as sound communications, where real time communications are strongly demanded.

FIG. 26 is a flowchart of another transmission parameter determination method according to one embodiment of the present invention. Although this flow is roughly similar to the flow described in conjunction with FIG. 25, they may differ in step S15'. At step S15' of the present flow, the transmission power for common use in both of the transmission antennas #1 and #2 is determined based on instantaneous channel quality values measured for the transmission antennas #1 and #2 and the determined MCS number. As a result, it is possible to reduce the number of control bits for control channels in AMC control.

FIG. 27 shows exemplary comparison among the different methods of determining the transmission bandwidth and the modulation schemes according to the seventh through the tenth embodiments. Similar to FIG. 12, the term "LOW" used in FIG. 27 means that the level of an item, such as the transmission power, at the top row of each column is determined under slow control, while the term "HIGH" used therein means that the level of an item at the top row of each column is determined under fast control, that is, the level is adaptively determined under control with instantaneous values of the channel quality indicator. The term "COMMON" used therein means that the level is commonly set among different transmission antennas. The term "SEPARATE" used therein means that the level is separately set among different transmission antennas.

The preferred embodiments of the present invention have been described. However, the present invention is not limited to the embodiments, and various modification and variations can be made within the spirit of the present invention. For convenience, the present invention has been described with reference to separate embodiments, but the separation of the embodiments is not essential to the present invention. One or more embodiments may be used if needed.

This international patent application is based on Japanese Priority Application No. 2005-317569 filed on Oct. 31, 2005, the entire contents of which are hereby incorporated by reference.

This international patent application is also based on Japanese Priority Application No. 2006-009300 filed on Jan. 17, 2006, the entire contents of which are hereby incorporated by reference.

The invention claimed is:

1. An apparatus for determining a transmission parameter for uplink transmission of a signal, comprising:
a reception unit receiving a channel quality indicator from a mobile station, the mobile station comprising:
a first transmission antenna and a second transmission antenna;
a storage unit storing relationship among a channel quality indicator, a modulation scheme and a channel coding rate, and one or both of transmission power and a transmission bandwidth of the mobile station;
a determination unit determining a set of transmission parameters based on the relationship; and
a transmission unit transmitting the set of transmission parameters to the mobile station,
wherein the determination unit comprises:
a channel condition measurement unit measuring a first uplink channel quality indicator based on a reception power level of an uplink pilot channel in an uplink from the first transmission antenna of the mobile station and a second uplink channel quality indicator based on a reception power level of an uplink pilot channel in an uplink from the second transmission antenna of the mobile station;
an average channel condition calculation unit calculating an average channel quality indicator based on the first and second uplink channel quality indicators;
a transmission power determination unit determining transmission power for transmission of an uplink data channel from the mobile station based on the average channel quality indicator;
a transmission bandwidth determination unit determining a transmission bandwidth for the uplink data channel based on the uplink channel quality indicators and the transmission power; and
a modulation level and channel coding rate determination unit determining a pair of a modulation level and a channel coding rate for the uplink data channel based on the uplink channel quality indicators and the transmission bandwidth.

2. The apparatus according to claim 1, wherein the modulation level and channel coding rate determination unit determines individual pairs of modulation levels and channel coding rates for the uplinks.

3. The apparatus according to claim 1, wherein the modulation level and channel coding rate determination unit determines a common pair of a modulation level and a channel coding rate for the uplinks.

4. An apparatus for determining a transmission parameter for uplink transmission of a signal, comprising:
a reception unit receiving a channel quality indicator from a mobile station, the mobile station comprising:
a first transmission antenna and a second transmission antenna;
a storage unit storing relationship among a channel quality indicator, a modulation scheme and a channel coding rate, and one or both of transmission power and a transmission bandwidth of the mobile station;
a determination unit determining a set of transmission parameters based on the relationship; and
a transmission unit transmitting the set of transmission parameters to the mobile station,
wherein the determination unit comprises:
a channel condition measurement unit measuring a first uplink channel quality indicator based on a reception power level of an uplink pilot channel in an uplink from the first transmission antenna of the mobile station and a second uplink channel quality indicator based on a reception power level of an uplink pilot channel in an uplink from the second transmission antenna of the mobile station;
an average channel condition calculation unit calculating an average channel quality indicator based on the first and second uplink channel quality indicators;
a transmission power determination unit determining transmission power for transmission of an uplink data channel from the mobile station based on the average channel quality indicator;
a transmission bandwidth determination unit determining a transmission bandwidth for the uplink data channel based on the calculated average channel quality indicator; and
a modulation level and channel coding rate determination unit determining a pair of a modulation level and a channel coding rate for the uplink data channel based on the uplink channel quality indicators and the transmission bandwidth.

5. The apparatus according to claim 4, wherein the modulation level and channel coding rate determination unit determines individual pairs of modulation levels and channel, coding rates for the uplinks.

6. The apparatus according to claim 4, wherein the modulation level and channel coding rate determination unit determines a common pair of a modulation level and a channel coding rate for the uplinks.

7. An apparatus for determining a transmission parameter for uplink transmission of a signal, comprising:
a reception unit receiving a channel quality indicator from a mobile station, the mobile station comprising:
a first transmission antenna and a second transmission antenna;
a storage unit storing relationship among a channel quality indicator, a modulation scheme and a channel coding rate, and one or both of transmission power and a transmission bandwidth of the mobile station;
a determination unit determining a set of transmission parameters based on the relationship; and
a transmission unit transmitting the set of transmission parameters to the mobile station,
wherein the determination unit comprises:
a channel condition measurement unit measuring a first uplink channel quality indicator based on a reception power level of an uplink pilot channel in an uplink from the first transmission antenna of the mobile station and a second uplink channel quality indicator based on a reception power level of an uplink pilot channel in an uplink from the second transmission antenna of the mobile station;
an average channel condition calculation unit calculating an average channel quality indicator based on the first and second uplink channel quality indicators;
a transmission bandwidth determination unit determining a transmission bandwidth for an uplink data channel from the mobile station based on the average channel quality indicator;

a modulation level and channel coding rate determination unit determining a pair of a modulation level and a channel coding rate for the uplink data channel based on the average channel quality indicator; and a transmission power determination unit determining transmission power for the first and second transmission antennas of the mobile station based on the uplink channel quality indicators.

8. An apparatus for determining a transmission parameter for uplink transmission of a signal, comprising;

a reception unit receiving a channel quality indicator from a mobile station, the mobile station comprising:
    a first transmission antenna and a second transmission antenna;
a storage unit storing relationship among a channel quality indicator, a modulation scheme and a channel coding rate, and one or both of transmission power and a transmission bandwidth of the mobile station;
a determination unit determining a set of transmission parameters based on the relationship; and
a transmission unit transmitting the set of transmission parameters to the mobile station,
wherein the determination unit comprises:
    a channel condition measurement unit measuring a first uplink channel quality indicator based on a reception power level of an uplink pilot channel in an uplink from the first transmission antenna of the mobile station and a second uplink channel quality indicator based on a reception power level of an uplink pilot channel in an uplink from the second transmission antenna of the mobile station;
    an average channel condition calculation unit calculating an average channel quality indicator based on the first and second uplink channel quality indicators;
    a transmission bandwidth determination unit determining a transmission bandwidth for an uplink data channel from the mobile station based on the average channel quality indicator;
    a modulation level and channel coding rate determination unit determining a pair of a modulation level and a channel coding rate for the uplink data channel based on the average channel quality indicator; and
    a transmission power determination unit determining common transmission power for the first and second transmission antennas of the mobile station based on the uplink channel quality indicators, the transmission bandwidth and the pair of the modulation level and the channel coding rate.

9. An apparatus for determining a transmission parameter for uplink transmission of a signal, comprising:

a reception unit receiving a channel quality indicator from a mobile station, the mobile station comprising:
    a first transmission antenna and a second transmission antenna;
a storage unit storing relationship among a channel quality indicator, a modulation scheme and a channel coding rate, and one or both of transmission power and a transmission bandwidth of the mobile station;
a determination unit determining a set of transmission parameters based on the relationship; and
a transmission unit transmitting the set of transmission parameters to the mobile station,
wherein the determination unit comprises:
    a channel condition measurement unit measuring a first uplink channel quality indicator based on a reception power level of an uplink pilot channel in an uplink from the first transmission antenna of the mobile station and a second uplink channel quality indicator based on a reception power level of an uplink pilot channel in an uplink from the second transmission antenna of the mobile station;
    an average channel condition calculation unit calculating an average channel quality indicator based on the first and second uplink channel quality indicators;
    a modulation level and channel coding rate determination unit determining a pair of a modulation level and a channel coding rate for an uplink data channel from the mobile station based on the average channel quality indicator;
    a transmission power determination unit determining transmission power for the first and second transmission antennas of the mobile station based on the uplink channel quality indicators and the pair of the modulation level and the channel coding rate; and
    a transmission bandwidth determination unit determining a transmission bandwidth for the uplink data channel based on the uplink channel quality indicators, the pair of the modulation level and the channel coding rate and the transmission power for the first and second transmission antennas.

10. An apparatus for determining a transmission parameter for uplink transmission of a signal, comprising:

a reception unit receiving a channel quality indicator from a mobile station, the mobile station comprising:
    a first transmission antenna and a second transmission antenna;
a storage unit storing relationship among a channel quality indicator, a modulation scheme and a channel coding rate, and one or both of transmission power and a transmission bandwidth of the mobile station;
a determination unit determining a set of transmission parameters based on the relationship; and
a transmission unit transmitting the set of transmission parameters to the mobile station,
wherein the determination unit comprises:
    a channel condition measurement unit measuring a first uplink channel quality indicator based on a reception power level of an uplink pilot channel in an uplink from the first transmission antenna of the mobile station and a second uplink channel quality indicator based on a reception power level of an uplink pilot channel in an uplink from the second transmission antenna of the mobile station;
    an average channel condition calculation unit calculating an average channel quality indicator based on the first and second uplink channel quality indicators;
    a modulation level and channel coding rate determination unit determining a pair of a modulation level and a channel coding rate for an uplink data channel from the mobile station based on the average channel quality indicator;
    a transmission power determination unit determining common transmission power for the first and second transmission antennas of the mobile station based on the uplink channel quality indicators and the pair of the modulation level and the channel coding rate; and
a transmission bandwidth determination unit determining a transmission bandwidth for the uplink data channel based on the uplink channel quality indicators, the pair of the modulation level and the channel coding rate and the common transmission power for the first and second transmission antennas.

* * * * *